United States Patent
Kim et al.

(10) Patent No.: US 10,454,556 B2
(45) Date of Patent: Oct. 22, 2019

(54) METHOD FOR REPORTING CHANNEL STATE AND APPARATUS THEREFOR

(71) Applicant: LG ELECTRONICS INC., Seoul (KR)

(72) Inventors: Kijun Kim, Seoul (KR); Jonghyun Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 217 days.

(21) Appl. No.: 15/518,413

(22) PCT Filed: Oct. 26, 2015

(86) PCT No.: PCT/KR2015/011297
§ 371 (c)(1),
(2) Date: Apr. 11, 2017

(87) PCT Pub. No.: WO2016/068553
PCT Pub. Date: May 6, 2016

(65) Prior Publication Data
US 2017/0310378 A1    Oct. 26, 2017

Related U.S. Application Data

(60) Provisional application No. 62/069,291, filed on Oct. 27, 2014.

(51) Int. Cl.
*H04B 7/06* (2006.01)
*H04B 7/04* (2017.01)
*H04B 7/0456* (2017.01)

(52) U.S. Cl.
CPC ............. *H04B 7/0626* (2013.01); *H04B 7/04* (2013.01); *H04B 7/0456* (2013.01); *H04B 7/0469* (2013.01); *H04B 7/06* (2013.01); *H04B 7/0639* (2013.01)

(58) Field of Classification Search
CPC ...... H04B 7/0626; H04B 7/04; H04B 7/0456; H04B 7/0469; H04B 7/06; H04B 7/0639
See application file for complete search history.

(56) References Cited

U.S. PATENT DOCUMENTS

2010/0273499 A1*  10/2010  van Rensburg ... H04W 72/1231
                                                        455/450
2011/0105164 A1*  5/2011   Lim ..................... H04B 7/0417
                                                        455/501
2012/0082248 A1   4/2012   Han et al.
2013/0163687 A1   6/2013   Jing et al.
(Continued)

FOREIGN PATENT DOCUMENTS

JP    2009-225130 A    10/2009

*Primary Examiner* — Melvin C Marcelo
(74) *Attorney, Agent, or Firm* — Birch, Stewart, Kolasch & Birch, LLP

(57) ABSTRACT

A method for reporting a channel state for a downlink channel according to an embodiment of the present invention, which is performed by a terminal, may comprise the steps of: receiving, from a base station, restriction information on a precoding matrix in a code book, wherein the restriction information on the precoding matrix is represented by one or more bit values; calculating a channel state value for the downlink channel using the limitation information, and transmitting the calculated channel state value to the base station.

14 Claims, 11 Drawing Sheets

(56) References Cited

U.S. PATENT DOCUMENTS

2013/0272250 A1* 10/2013 Shimezawa ............ H04B 7/063
  370/329
2014/0016549 A1    1/2014 Novlan et al.
2014/0301492 A1   10/2014 Xin et al.

* cited by examiner (a)

(b)

METHOD FOR REPORTING CHANNEL STATE AND APPARATUS THEREFOR

CROSS REFERENCE TO RELATED APPLICATIONS

This application is the National Phase of PCT International Application No. PCT/KR2015/011297, filed on Oct. 26, 2015, which claims priority under 35 U.S.C. 119(e) to U.S. Provisional Application No. 62/069,291, filed on Oct. 27, 2014, all of which are hereby expressly incorporated by reference into the present application.

TECHNICAL FIELD

The present invention relates to a wireless communication system, and more particularly, to a method for reporting a channel state and apparatus therefor.

BACKGROUND ART

Recently, various devices requiring machine-to-machine (M2M) communication and high data transfer rate, such as smartphones or tablet personal computers (PCs), have appeared and come into widespread use. This has rapidly increased the quantity of data which needs to be processed in a cellular network. In order to satisfy such rapidly increasing data throughput, recently, carrier aggregation (CA) technology which efficiently uses more frequency bands, cognitive ratio technology, multiple antenna (MIMO) technology for increasing data capacity in a restricted frequency, multiple-base-station cooperative technology, etc. have been highlighted. In addition, communication environments have evolved such that the density of accessible nodes is increased in the vicinity of a user equipment (UE). Here, the node includes one or more antennas and refers to a fixed point capable of transmitting/receiving radio frequency (RF) signals to/from the user equipment (UE). A communication system including high-density nodes may provide a communication service of higher performance to the UE by cooperation between nodes.

A multi-node coordinated communication scheme in which a plurality of nodes communicates with a user equipment (UE) using the same time-frequency resources has much higher data throughput than legacy communication scheme in which each node operates as an independent base station (BS) to communicate with the UE without cooperation.

A multi-node system performs coordinated communication using a plurality of nodes, each of which operates as a base station or an access point, an antenna, an antenna group, a remote radio head (RRH), and a remote radio unit (RRU). Unlike the conventional centralized antenna system in which antennas are concentrated at a base station (BS), nodes are spaced apart from each other by a predetermined distance or more in the multi-node system. The nodes can be managed by one or more base stations or base station controllers which control operations of the nodes or schedule data transmitted/received through the nodes. Each node is connected to a base station or a base station controller which manages the node through a cable or a dedicated line.

The multi-node system can be considered as a kind of Multiple Input Multiple Output (MIMO) system since dispersed nodes can communicate with a single UE or multiple UEs by simultaneously transmitting/receiving different data streams. However, since the multi-node system transmits signals using the dispersed nodes, a transmission area covered by each antenna is reduced compared to antennas included in the conventional centralized antenna system. Accordingly, transmit power required for each antenna to transmit a signal in the multi-node system can be reduced compared to the conventional centralized antenna system using MIMO. In addition, a transmission distance between an antenna and a UE is reduced to decrease in pathloss and enable rapid data transmission in the multi-node system. This can improve transmission capacity and power efficiency of a cellular system and meet communication performance having relatively uniform quality regardless of UE locations in a cell. Further, the multi-node system reduces signal loss generated during transmission since base station(s) or base station controller(s) connected to a plurality of nodes transmit/receive data in cooperation with each other. When nodes spaced apart by over a predetermined distance perform coordinated communication with a UE, correlation and interference between antennas are reduced. Therefore, a high signal to interference-plus-noise ratio (SINR) can be obtained according to the multi-node coordinated communication scheme.

Owing to the above-mentioned advantages of the multi-node system, the multi-node system is used with or replaces the conventional centralized antenna system to become a new foundation of cellular communication in order to reduce base station cost and backhaul network maintenance cost while extending service coverage and improving channel capacity and SINR in next-generation mobile communication systems.

DISCLOSURE OF THE INVENTION

Technical Task

The present invention proposes a scheme for a channel state reporting, and more particularly, a channel state reporting through restriction put on a precoding matrix for a downlink channel state reporting.

Technical tasks obtainable from the present invention are non-limited by the above-mentioned technical task. And, other unmentioned technical tasks can be clearly understood from the following description by those having ordinary skill in the technical field to which the present invention pertains.

Technical Solutions

In one technical aspect of the present invention, provided herein is a method of reporting a channel state of a downlink channel, the method performed by a terminal, the method including receiving restriction information on a precoding matrix in a codebook from a base station, wherein the restriction information on the precoding matrix is represented by at least one bit value, calculating a channel state value for the downlink channel using the restriction information, and transmitting the calculated channel state value to the base station.

Additionally or alternatively, the restriction information on the precoding matrix may be determined depending on an inter-cell interference level.

Additionally or alternatively, the restriction information on the precoding matrix may include an offset of downlink transmission power.

Additionally or alternatively, the restriction information on the precoding matrix may include restriction information per precoding group in the codebook.

Additionally or alternatively, the precoding group may be divided based on a beam direction or beam width of a downlink transmitted signal.

Additionally or alternatively, the restriction information on the precoding matrix may include restriction information designated to each of a plurality of CSI-RS (channel state information-reference signal) configurations configured for the terminal.

Additionally or alternatively, the restriction information on the precoding matrix may include restriction information designated to each of a plurality of CSI processes configured for the terminal.

Additionally or alternatively, the restriction information on the precoding matrix may include restriction information designated to each of a plurality of CSI subframe sets configured for the terminal.

In another technical aspect of the present invention, provided herein is a terminal configured to report a channel state of a downlink channel, the terminal including a radio frequency (RF) unit and a processor configured to control the RF unit, wherein the processor is further configured to receive restriction information on a precoding matrix in a codebook from a base station, wherein the restriction information on the precoding matrix is represented as at least one bit value, wherein the processor is further configured to calculate a channel state value for the downlink channel using the restriction information and transmit the calculated channel state value to the base station.

Additionally or alternatively, the restriction information on the precoding matrix may be determined depending on an inter-cell interference level.

Additionally or alternatively, the restriction information on the precoding matrix may include an offset of downlink transmission power.

Additionally or alternatively, the restriction information on the precoding matrix may include restriction information per precoding group in the codebook.

Additionally or alternatively, the precoding group may be divided based on a beam direction or beam width of a downlink transmitted signal.

Additionally or alternatively, the restriction information on the precoding matrix may include restriction information designated to each of a plurality of CSI-RS (channel state information-reference signal) configurations configured for the terminal.

Additionally or alternatively, the restriction information on the precoding matrix may include restriction information designated to each of a plurality of CSI processes configured for the terminal.

Additionally or alternatively, the restriction information on the precoding matrix may include restriction information designated to each of a plurality of CSI subframe sets configured for the terminal.

The technical solutions just include embodiments of the present invention in part, and various embodiments reflecting the technical features of the present invention can be derived and understood by those skilled in the art, to which the corresponding technical field pertains, based on the detailed description of the present invention in the following.

Advantageous Effects

According to one embodiment of the present invention, an efficient channel state reporting is possible.

Effects obtainable from the present invention are non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

BEST MODE FOR INVENTION

Figure 1:
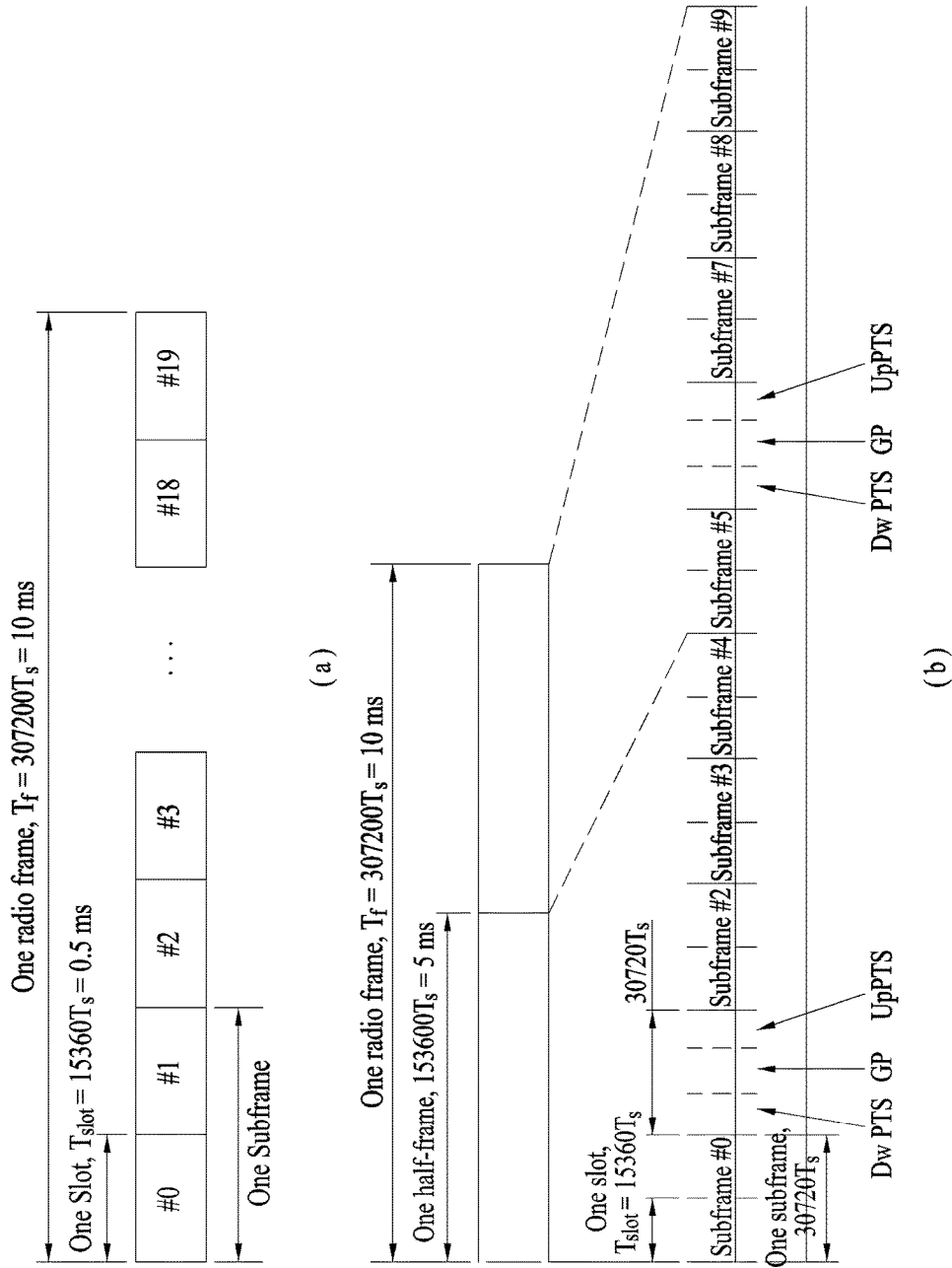
FIG. 1 shows one example of a radio frame structure used by a wireless communication system.

Reference will now be made in detail to the preferred embodiments of the present invention, examples of which are illustrated in the accompanying drawings. The accompanying drawings illustrate exemplary embodiments of the present invention and provide a more detailed description of the present invention. However, the scope of the present invention should not be limited thereto.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the present invention, a user equipment (UE) is fixed or mobile. The UE is a device that transmits and receives user data and/or control information by communicating with a base station (BS). The term 'UE' may be replaced with 'terminal equipment', 'Mobile Station (MS)', 'Mobile Terminal (MT)', 'User Terminal (UT)', 'Subscriber Station (SS)', 'wireless device', 'Personal Digital Assistant (PDA)', 'wireless modem', 'handheld device', etc. A BS is typically a fixed station that communicates with a UE and/or another BS. The BS exchanges data and control information with a UE and another BS. The term 'BS' may be replaced with 'Advanced Base Station (ABS)', 'Node B', 'evolved-Node B (eNB)', 'Base Transceiver System (BTS)', 'Access Point (AP)', 'Processing Server (PS)', etc. In the following description, BS is commonly called eNB.

In the present invention, a node refers to a fixed point capable of transmitting/receiving a radio signal to/from a UE by communication with the UE. Various eNBs can be used as nodes. For example, a node can be a BS, NB, eNB, pico-cell eNB (PeNB), home eNB (HeNB), relay, repeater, etc. Furthermore, a node may not be an eNB. For example, a node can be a radio remote head (RRH) or a radio remote unit (RRU). The RRH and RRU have power levels lower than that of the eNB. Since the RRH or RRU (referred to as RRH/RRU hereinafter) is connected to an eNB through a dedicated line such as an optical cable in general, cooperative communication according to RRH/RRU and eNB can be smoothly performed compared to cooperative communication according to eNBs connected through a wireless link. At least one antenna is installed per node. An antenna may refer to an antenna port, a virtual antenna or an antenna group. A node may also be called a point. Unlink a conventional centralized antenna system (CAS) (i.e., single node system) in which antennas are concentrated in an eNB and controlled an eNB controller, plural nodes are spaced apart at a predetermined distance or longer in a multi-node system. The plural nodes can be managed by one or more eNBs or eNB controllers that control operations of the nodes or schedule data to be transmitted/received through the nodes. Each node may be connected to an eNB or eNB controller managing the corresponding node via a cable or a dedicated line. In the multi-node system, the same cell identity (ID) or different cell IDs may be used for signal transmission/reception through plural nodes. When plural nodes have the same cell ID, each of the plural nodes operates as an antenna group of a cell. If nodes have different cell IDs in the multi-node system, the multi-node system can be regarded as a multi-cell (e.g., macro-cell/femto-cell/pico-cell) system. When multiple cells respectively configured by plural nodes are overlaid according to coverage, a network configured by multiple cells is called a multi-tier network. The cell ID of the RRH/RRU may be identical to or different from the cell ID of an eNB. When the RRH/RRU and eNB use different cell IDs, both the RRH/RRU and eNB operate as independent eNBs.

In a multi-node system according to the present invention, which will be described below, one or more eNBs or eNB controllers connected to multiple nodes may control the nodes such that signals are simultaneously transmitted to or received from a UE through some or all nodes. While there is a difference between multi-node systems according to the nature of each node and implementation form of each node, multi-node systems are discriminated from single node systems (e.g., a centralized antenna system (CAS), conventional MIMO systems, conventional relay systems, conventional repeater systems, etc.) since a plurality of nodes provides communication services to a UE in a predetermined time-frequency resource. Accordingly, embodiments of the present invention with respect to a method of performing coordinated data transmission using some or all nodes may be applied to various types of multi-node systems. For example, a node refers to an antenna group spaced apart from another node by a predetermined distance or more, in general. However, embodiments of the present invention, which will be described below, may even be applied to a case in which a node refers to an arbitrary antenna group irrespective of node interval. In the case of an eNB including an X-pole (cross-polarized) antenna, for example, the embodiments of the preset invention are applicable on the assumption that the eNB controls a node composed of an H-pole antenna and a node composed of a V-pole antenna.

A communication scheme through which signals are transmitted/received via plural transmit (Tx)/receive (Rx) nodes, signals are transmitted/received via at least one node selected from plural Tx/Rx nodes, or a node transmitting a downlink signal is discriminated from a node transmitting an uplink signal is called multi-eNB MIMO or CoMP (Coordinated Multi-Point Tx/Rx). Coordinated transmission schemes from among CoMP communication schemes can be categorized into JP (Joint Processing) and scheduling coordination. The former may be divided into JT (Joint Transmission)/JR (Joint Reception) and DPS (Dynamic Point Selection) and the latter may be divided into CS (Coordinated Scheduling) and CB (Coordinated Beamforming). DPS may be called DCS (Dynamic Cell Selection). When JP is performed, more various communication environments can be generated, compared to other CoMP schemes. JT refers to a communication scheme by which plural nodes transmit the same stream to a UE and JR refers to a communication scheme by which plural nodes receive the same stream from the UE. The UE/eNB combine signals received from the plural nodes to restore the stream. In the case of JT/JR, signal transmission reliability can be improved according to transmit diversity since the same stream is transmitted from/to plural nodes. DPS refers to a communication scheme by which a signal is transmitted/received through a node selected from plural nodes according to a specific rule. In the case of DPS, signal transmission reliability can be improved because a node having a good channel state between the node and a UE is selected as a communication node.

In the present invention, a cell refers to a specific geographical area in which one or more nodes provide communication services. Accordingly, communication with a specific cell may mean communication with an eNB or a node providing communication services to the specific cell. A downlink/uplink signal of a specific cell refers to a downlink/uplink signal from/to an eNB or a node providing communication services to the specific cell. A cell providing uplink/downlink communication services to a UE is called a serving cell. Furthermore, channel status/quality of a specific cell refers to channel status/quality of a channel or a communication link generated between an eNB or a node providing communication services to the specific cell and a UE. In 3GPP LTE-A systems, a UE can measure downlink channel state from a specific node using one or more CSI-RSs (Channel State Information Reference Signals) transmitted through antenna port(s) of the specific node on a CSI-RS resource allocated to the specific node. In general, neighboring nodes transmit CSI-RS resources on orthogonal CSI-RS resources. When CSI-RS resources are orthogonal, this means that the CSI-RS resources have different subframe configurations and/or CSI-RS sequences which specify subframes to which CSI-RSs are allocated according to CSI-RS resource configurations, subframe offsets and transmission periods, etc. which specify symbols and subcarriers carrying the CSI RSs.

In the present invention, PDCCH (Physical Downlink Control Channel)/PCFICH (Physical Control Format Indicator Channel)/PHICH (Physical Hybrid automatic repeat request Indicator Channel)/PDSCH (Physical Downlink Shared Channel) refer to a set of time-frequency resources or resource elements respectively carrying DCI (Downlink Control Information)/CFI (Control Format Indicator)/downlink ACK/NACK (Acknowledgement/Negative ACK)/downlink data. In addition, PUCCH (Physical Uplink Control Channel)/PUSCH (Physical Uplink Shared Channel)/PRACH (Physical Random Access Channel) refer to sets of time-frequency resources or resource elements respectively carrying UCI (Uplink Control Information)/uplink data/random access signals. In the present invention, a time-frequency resource or a resource element (RE), which is allocated to or belongs to PDCCH/PCFICH/PHICH/PDSCH/PUCCH/PUSCH/PRACH, is referred to as a PDCCH/PCFICH/PHICH/PDSCH/PUCCH/PUSCH/PRACH RE or PDCCH/PCFICH/PHICH/PDSCH/PUCCH/PUSCH/PRACH resource. In the following description, transmission of PUCCH/PUSCH/PRACH by a UE is equivalent to transmission of uplink control information/uplink data/random access signal through or on PUCCH/PUSCH/PRACH. Furthermore, transmission of PDCCH/PCFICH/PHICH/PDSCH by an eNB is equivalent to transmission of downlink data/control information through or on PDCCH/PCFICH/PHICH/PDSCH.

FIG. 1 illustrates an exemplary radio frame structure used in a wireless communication system. FIG. 1(a) illustrates a frame structure for frequency division duplex (FDD) used in 3GPP LTE/LTE-A and FIG. 1(b) illustrates a frame structure for time division duplex (TDD) used in 3GPP LTE/LTE-A.

TABLE 1

| DL-UL configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes three fields of DwPTS (Downlink Pilot TimeSlot), GP (Guard Period), and UpPTS (Uplink Pilot TimeSlot). DwPTS is a period reserved for downlink transmission and UpPTS is a period reserved for uplink transmission. Table 2 shows special subframe configuration.

TABLE 2

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | | |
| 5 | 6592 · $T_s$ | 4384 · $T_s$ | 5120 · $T_s$ | 20480 · $T_s$ | 4384 · $T_s$ | 5120 · $T_s$ |
| 6 | 19760 · $T_s$ | | | 23040 · $T_s$ | | |
| 7 | 21952 · $T_s$ | | | 12800 · $T_s$ | | |
| 8 | 24144 · $T_s$ | | | — | — | — |
| 9 | 13168 · $T_s$ | | | — | — | — |

Referring to FIG. 1, a radio frame used in 3GPP LTE/LTE-A has a length of 10 ms (307200Ts) and includes 10 subframes in equal size. The 10 subframes in the radio frame may be numbered. Here, Ts denotes sampling time and is represented as Ts=1/(2048*15 kHz). Each subframe has a length of 1 ms and includes two slots. 20 slots in the radio frame can be sequentially numbered from 0 to 19. Each slot has a length of 0.5 ms. A time for transmitting a subframe is defined as a transmission time interval (TTI). Time resources can be discriminated by a radio frame number (or radio frame index), subframe number (or subframe index) and a slot number (or slot index).

The radio frame can be configured differently according to duplex mode. Downlink transmission is discriminated from uplink transmission by frequency in FDD mode, and thus the radio frame includes only one of a downlink subframe and an uplink subframe in a specific frequency band. In TDD mode, downlink transmission is discriminated from uplink transmission by time, and thus the radio frame includes both a downlink subframe and an uplink subframe in a specific frequency band.

Table 1 shows DL-UL configurations of subframes in a radio frame in the TDD mode.

Figure 2:
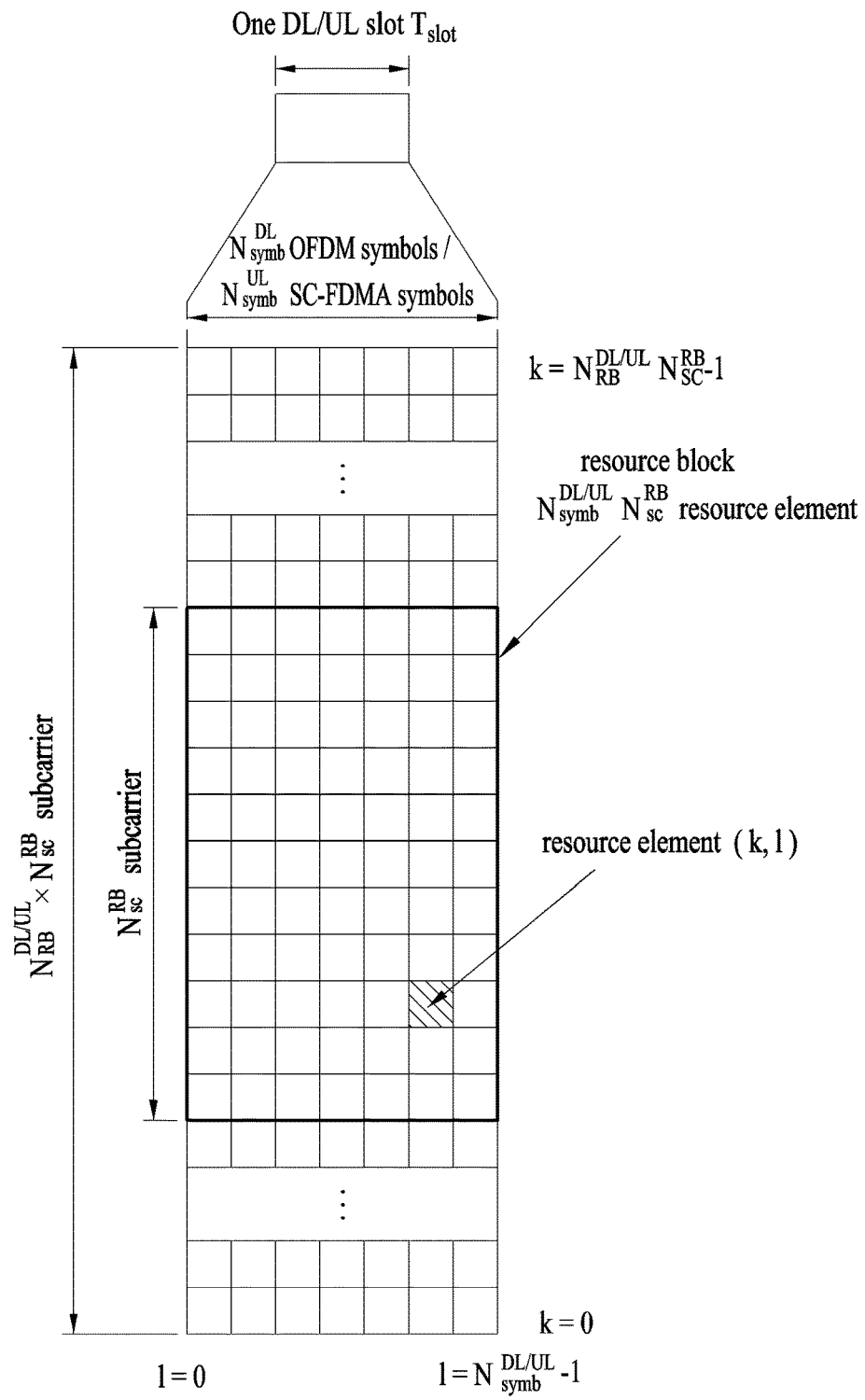
FIG. 2 shows one example of an uplink/downlink (UL/DL) slot structure in a wireless communication system.

FIG. 2 illustrates an exemplary downlink/uplink slot structure in a wireless communication system. Particularly, FIG. 2 illustrates a resource grid structure in 3GPP LTE/LTE-A. A resource grid is present per antenna port.

Referring to FIG. 2, a slot includes a plurality of OFDM (Orthogonal Frequency Division Multiplexing) symbols in the time domain and a plurality of resource blocks (RBs) in the frequency domain. An OFDM symbol may refer to a symbol period. A signal transmitted in each slot may be represented by a resource grid composed of $N_{RB}^{DL/UL}*N_{sc}^{RB}$ subcarriers and $N_{symb}^{DL/UL}$ OFDM symbols. Here, $N_{RB}^{DL}$ denotes the number of RBs in a downlink slot and $N_{RB}^{UL}$ denotes the number of RBs in an uplink slot. $N_{RB}^{DL}$ and $N_{RB}^{UL}$ respectively depend on a DL transmission bandwidth and a UL transmission bandwidth. $N_{symb}^{DL}$ denotes the number of OFDM symbols in the downlink slot and $N_{symb}^{UL}$ denotes the number of OFDM symbols in the uplink slot. In addition, $N_{sc}^{RB}$ denotes the number of subcarriers constructing one RB.

An OFDM symbol may be called an SC-FDM (Single Carrier Frequency Division Multiplexing) symbol according to multiple access scheme. The number of OFDM symbols included in a slot may depend on a channel bandwidth and the length of a cyclic prefix (CP). For example, a slot includes 7 OFDM symbols in the case of normal CP and 6

OFDM symbols in the case of extended CP. While FIG. 2 illustrates a subframe in which a slot includes 7 OFDM symbols for convenience, embodiments of the present invention can be equally applied to subframes having different numbers of OFDM symbols. Referring to FIG. 2, each OFDM symbol includes $N_{RB}^{DL/UL} * N_{sc}^{RB}$ subcarriers in the frequency domain. Subcarrier types can be classified into a data subcarrier for data transmission, a reference signal subcarrier for reference signal transmission, and null subcarriers for a guard band and a direct current (DC) component. The null subcarrier for a DC component is a subcarrier remaining unused and is mapped to a carrier frequency (f0) during OFDM signal generation or frequency up-conversion. The carrier frequency is also called a center frequency.

An RB is defined by $N_{symb}^{DL/UL}$ (e.g., 7) consecutive OFDM symbols in the time domain and $N_{sc}^{RB}$ (e.g., 12) consecutive subcarriers in the frequency domain. For reference, a resource composed by an OFDM symbol and a subcarrier is called a resource element (RE) or a tone. Accordingly, an RB is composed of $N_{symb}^{DL/UL} * N_{sc}^{RB}$ REs. Each RE in a resource grid can be uniquely defined by an index pair (k, 1) in a slot. Here, k is an index in the range of 0 to $N_{symb}^{DL/UL} * N_{sc}^{RB} - 1$ in the frequency domain and 1 is an index in the range of 0 to $N_{symb}^{DL/UL} - 1$.

Two RBs that occupy $N_{sc}^{RB}$ consecutive subcarriers in a subframe and respectively disposed in two slots of the subframe are called a physical resource block (PRB) pair. Two RBs constituting a PRB pair have the same PRB number (or PRB index). A virtual resource block (VRB) is a logical resource allocation unit for resource allocation. The VRB has the same size as that of the PRB. The VRB may be divided into a localized VRB and a distributed VRB depending on a mapping scheme of VRB into PRB. The localized VRBs are mapped into the PRBs, whereby VRB number (VRB index) corresponds to PRB number. That is, nPRB=nVRB is obtained. Numbers are given to the localized VRBs from 0 to $N_{VRB}^{DL} - 1$, and $N_{VRB}^{DL} = N_{RB}^{DL}$ is obtained. Accordingly, according to the localized mapping scheme, the VRBs having the same VRB number are mapped into the PRBs having the same PRB number at the first slot and the second slot. On the other hand, the distributed VRBs are mapped into the PRBs through interleaving. Accordingly, the VRBs having the same VRB number may be mapped into the PRBs having different PRB numbers at the first slot and the second slot. Two PRBs which are respectively located at two slots of the subframe and have the same VRB number, will be referred to as a pair of VRBs.

Figure 3:
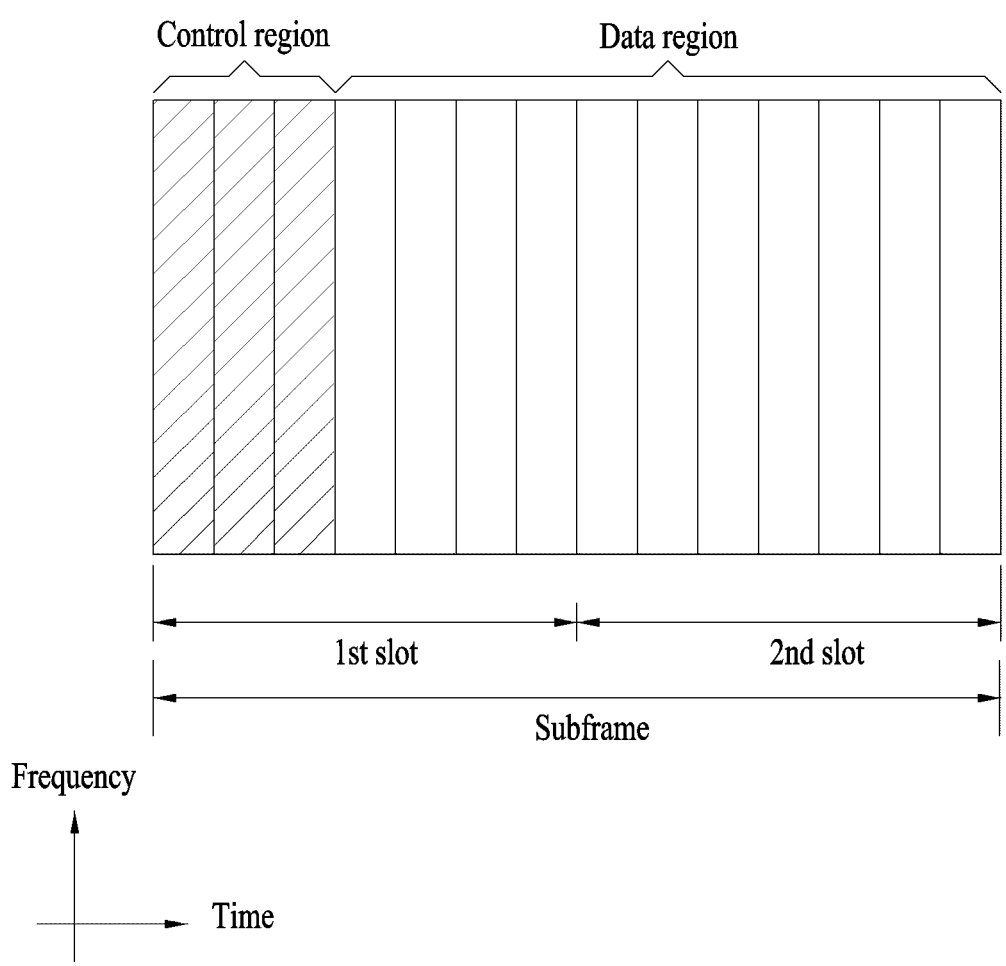
FIG. 3 shows one example of a downlink (DL) subframe structure used by 3GPP LTE/LTE-A system.

FIG. 3 illustrates a downlink (DL) subframe structure used in 3GPP LTE/LTE-A.

Referring to FIG. 3, a DL subframe is divided into a control region and a data region. A maximum of three (four) OFDM symbols located in a front portion of a first slot within a subframe correspond to the control region to which a control channel is allocated. A resource region available for PDCCH transmission in the DL subframe is referred to as a PDCCH region hereinafter. The remaining OFDM symbols correspond to the data region to which a physical downlink shared chancel (PDSCH) is allocated. A resource region available for PDSCH transmission in the DL subframe is referred to as a PDSCH region hereinafter. Examples of downlink control channels used in 3GPP LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative acknowledgment (NACK) signal.

Control information carried on the PDCCH is called downlink control information (DCI). The DCI contains resource allocation information and control information for a UE or a UE group. For example, the DCI includes a transport format and resource allocation information of a downlink shared channel (DL-SCH), a transport format and resource allocation information of an uplink shared channel (UL-SCH), paging information of a paging channel (PCH), system information on the DL-SCH, information about resource allocation of an upper layer control message such as a random access response transmitted on the PDSCH, a transmit control command set with respect to individual UEs in a UE group, a transmit power control command, information on activation of a voice over IP (VoIP), downlink assignment index (DAI), etc. The transport format and resource allocation information of the DL-SCH are also called DL scheduling information or a DL grant and the transport format and resource allocation information of the UL-SCH are also called UL scheduling information or a UL grant. The size and purpose of DCI carried on a PDCCH depend on DCI format and the size thereof may be varied according to coding rate. Various formats, for example, formats 0 and 4 for uplink and formats 1, 1A, 1B, 1C, 1D, 2, 2A, 2B, 2C, 3 and 3A for downlink, have been defined in 3GPP LTE. Control information such as a hopping flag, information on RB allocation, modulation coding scheme (MCS), redundancy version (RV), new data indicator (NDI), information on transmit power control (TPC), cyclic shift demodulation reference signal (DMRS), UL index, channel quality information (CQI) request, DL assignment index, HARQ process number, transmitted precoding matrix indicator (TPMI), precoding matrix indicator (PMI), etc. is selected and combined based on DCI format and transmitted to a UE as DCI.

In general, a DCI format for a UE depends on transmission mode (TM) set for the UE. In other words, only a DCI format corresponding to a specific TM can be used for a UE configured in the specific TM.

A PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). For example, a CCE corresponds to 9 REGs and an REG corresponds to 4 REs. 3GPP LTE defines a CCE set in which a PDCCH can be located for each UE. A CCE set from which a UE can detect a PDCCH thereof is called a PDCCH search space, simply, search space. An individual resource through which the PDCCH can be transmitted within the search space is called a PDCCH candidate. A set of PDCCH candidates to be monitored by the UE is defined as the search space. In 3GPP LTE/LTE-A, search spaces for DCI formats may have different sizes and include a dedicated search space and a common search space. The dedicated search space is a UE-specific search space and is configured for each UE. The common search space is configured for a plurality of UEs. Aggregation levels defining the search space is as follows.

TABLE 3

| Search Space | | | Number of PDCCH |
|---|---|---|---|
| Type | Aggregation Level L | Size [in CCEs] | candidates $M^{(L)}$ |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

A PDCCH candidate corresponds to 1, 2, 4 or 8 CCEs according to CCE aggregation level. An eNB transmits a PDCCH (DCI) on an arbitrary PDCCH candidate with in a search space and a UE monitors the search space to detect the PDCCH (DCI). Here, monitoring refers to attempting to decode each PDCCH in the corresponding search space according to all monitored DCI formats. The UE can detect the PDCCH thereof by monitoring plural PDCCHs. Since the UE does not know the position in which the PDCCH thereof is transmitted, the UE attempts to decode all PDCCHs of the corresponding DCI format for each subframe until a PDCCH having the ID thereof is detected. This process is called blind detection (or blind decoding (BD)).

The eNB can transmit data for a UE or a UE group through the data region. Data transmitted through the data region may be called user data. For transmission of the user data, a physical downlink shared channel (PDSCH) may be allocated to the data region. A paging channel (PCH) and downlink-shared channel (DL-SCH) are transmitted through the PDSCH. The UE can read data transmitted through the PDSCH by decoding control information transmitted through a PDCCH. Information representing a UE or a UE group to which data on the PDSCH is transmitted, how the UE or UE group receives and decodes the PDSCH data, etc. is included in the PDCCH and transmitted. For example, if a specific PDCCH is CRC (cyclic redundancy check)-masked having radio network temporary identify (RNTI) of "A" and information about data transmitted using a radio resource (e.g., frequency position) of "B" and transmission format information (e.g., transport block size, modulation scheme, coding information, etc.) of "C" is transmitted through a specific DL subframe, the UE monitors PDCCHs using RNTI information and a UE having the RNTI of "A" detects a PDCCH and receives a PDSCH indicated by "B" and "C" using information about the PDCCH.

A reference signal (RS) to be compared with a data signal is necessary for the UE to demodulate a signal received from the eNB. A reference signal refers to a predetermined signal having a specific waveform, which is transmitted from the eNB to the UE or from the UE to the eNB and known to both the eNB and UE. The reference signal is also called a pilot. Reference signals are categorized into a cell-specific RS shared by all UEs in a cell and a modulation RS (DM RS) dedicated for a specific UE. A DM RS transmitted by the eNB for demodulation of downlink data for a specific UE is called a UE-specific RS. Both or one of DM RS and CRS may be transmitted on downlink. When only the DM RS is transmitted without CRS. an RS for channel measurement needs to be additionally provided because the DM RS transmitted using the same precoder as used for data can be used for demodulation only. For example, in 3GPP LTE(-A), CSI-RS corresponding to an additional RS for measurement is transmitted to the UE such that the UE can measure channel state information. CSI-RS is transmitted in each transmission period corresponding to a plurality of subframes based on the fact that channel state variation with time is not large, unlike CRS transmitted per subframe.

Figure 4:
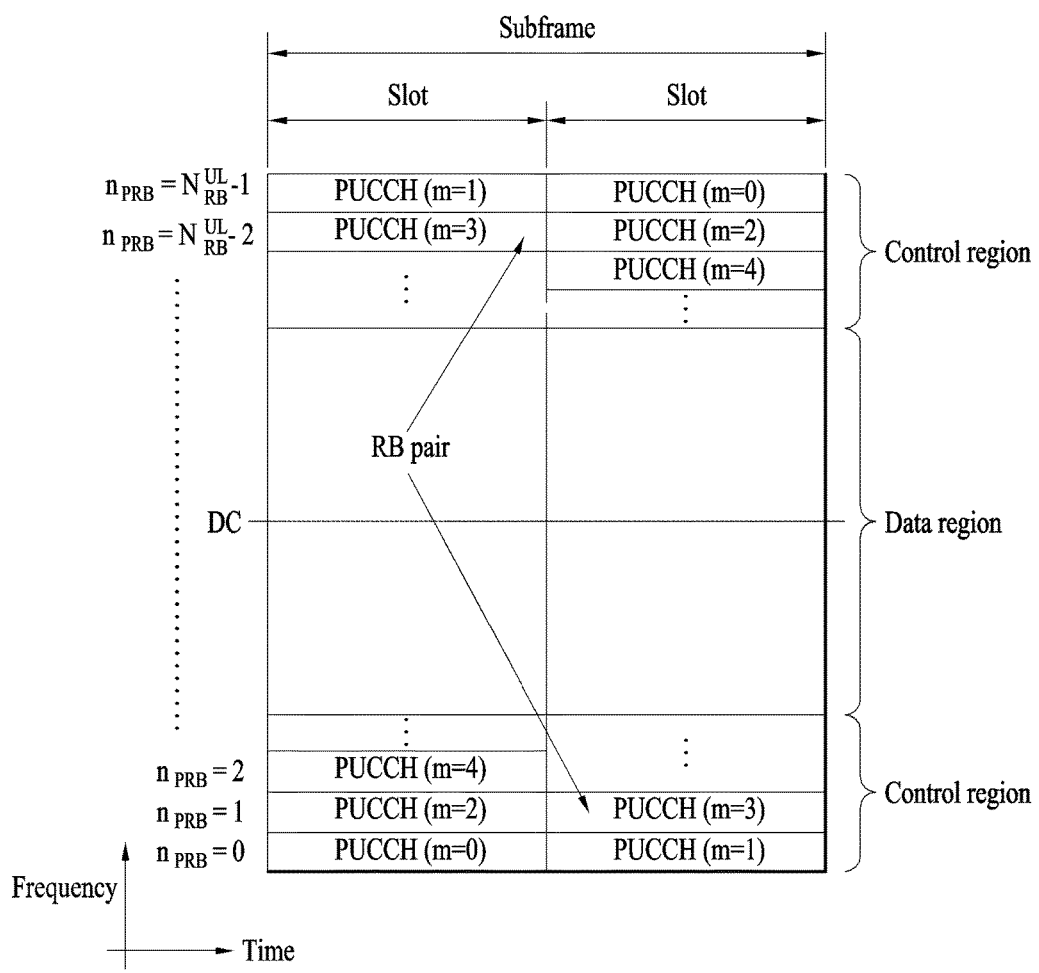
FIG. 4 shows one example of an uplink (UL) subframe structure used by 3GPP LTE/LTE-A system.

FIG. 4 illustrates an exemplary uplink subframe structure used in 3GPP LTE/LTE-A.

Referring to FIG. 4, a UL subframe can be divided into a control region and a data region in the frequency domain. One or more PUCCHs (physical uplink control channels) can be allocated to the control region to carry uplink control information (UCI). One or more PUSCHs (Physical uplink shared channels) may be allocated to the data region of the UL subframe to carry user data.

In the UL subframe, subcarriers spaced apart from a DC subcarrier are used as the control region. In other words, subcarriers corresponding to both ends of a UL transmission bandwidth are assigned to UCI transmission. The DC subcarrier is a component remaining unused for signal transmission and is mapped to the carrier frequency f0 during frequency up-conversion. A PUCCH for a UE is allocated to an RB pair belonging to resources operating at a carrier frequency and RBs belonging to the RB pair occupy different subcarriers in two slots. Assignment of the PUCCH in this manner is represented as frequency hopping of an RB pair allocated to the PUCCH at a slot boundary. When frequency hopping is not applied, the RB pair occupies the same subcarrier.

The PUCCH can be used to transmit the following control information.

Scheduling Request (SR): This is information used to request a UL-SCH resource and is transmitted using On-Off Keying (OOK) scheme.

HARQ ACK/NACK: This is a response signal to a downlink data packet on a PDSCH and indicates whether the downlink data packet has been successfully received. A 1-bit ACK/NACK signal is transmitted as a response to a single downlink codeword and a 2-bit ACK/NACK signal is transmitted as a response to two downlink codewords. HARQ-ACK responses include positive ACK (ACK), negative ACK (HACK), discontinuous transmission (DTX) and NACK/DTX. Here, the term HARQ-ACK is used interchangeably with the term HARQ ACK/NACK and ACK/NACK.

Channel State Indicator (CSI): This is feedback information about a downlink channel. Feedback information regarding MIMO includes a rank indicator (RI) and a precoding matrix indicator (PMI).

The quantity of control information (UCI) that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a sounding reference signal (SRS) is configured, the last SC-FDMA symbol of the subframe is excluded from the SC-FDMA symbols available for control information transmission. A reference signal is used to detect coherence of the PUCCH. The PUCCH supports various formats according to information transmitted thereon.

Table 4 shows the mapping relationship between PUCCH formats and UCI in LTE/LTE-A.

TABLE 4

| PUCCH format | Modulation scheme | Number of bits per subframe, $M_{bit}$ | Usage | Etc. |
|---|---|---|---|---|
| 1 | N/A | N/A(exist or absent) | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK or SR + ACK/NACK or CQI/PMI/RI + ACK/NACK | |

Referring to Table 4, PUCCH formats 1/1a/1b are used to transmit ACK/NACK information, PUCCH format 2/2a/2b are used to carry CSI such as CQI/PMI/RI and PUCCH format 3 is used to transmit ACK/NACK information.

Figure 5:
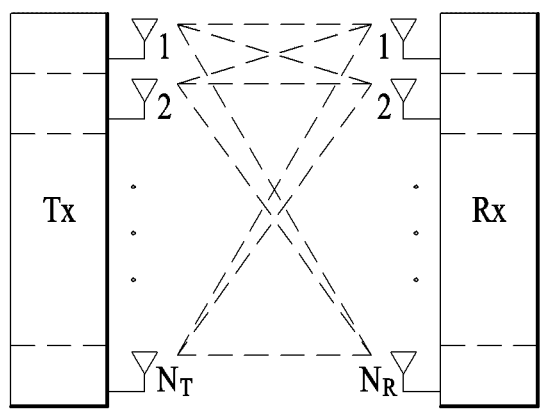
FIG. 5 is a block diagram of MIMO (multi-input multi-output) used by 3GPP LTE/LTE-A system.
Figure 5:
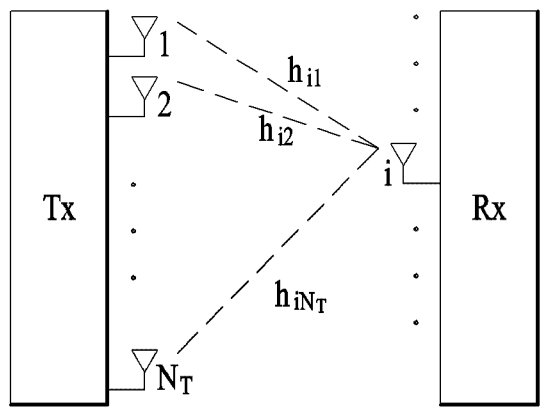

FIG. 5 shows the configuration of a wireless communication system including multiple antennas.

As shown in FIG. 5(a), when both the number of transmit (Tx) antennas and the number of Rx antennas are increased respectively to $N_T$ and $N_R$, a theoretical channel transmission capacity of the MIMO communication system increases in proportion to the number of antennas, differently from the case in which only a transmitter or receiver uses several antennas, so that transmission rate and frequency efficiency can be greatly increased. In this case, the transfer rate acquired by the increasing channel transmission capacity can theoretically increase by a predetermined amount that corresponds to multiplication of a maximum transfer rate ($R_o$) acquired when one antenna is used and a rate of increase ($R_i$). The rate of increase ($R_i$) can be represented by the following equation 1.

$$R_i = \min(N_T, N_R) \quad \text{[Equation 1]}$$

For example, provided that a MIMO system uses four Tx antennas and four Rx antennas, the MIMO system can theoretically acquire a high transfer rate which is four times higher than that of a single antenna system.

Mathematical modeling of a communication method for use in the above-mentioned MIMO system will hereinafter be described in detail. It is assumed that there are $N_T$ Tx antennas and $N_R$ Rx antennas.

In the case of a transmission signal, a maximum number of transmission information pieces is $N_T$ under the condition that $N_T$ Tx antennas are used, so that the transmission information can be represented by a specific vector shown in the following equation 2.

$$s = [s_1, s_2, \ldots, s_{N_T}]^T \quad \text{[Equation 2]}$$

Individual transmission information pieces $s_1, s_2, \ldots s_{N_T}$ may have different transmission powers. In this case, if the individual transmission powers are denoted by $P_1, P_2, \ldots, P_{N_T}$, transmission information having an adjusted transmission power can be represented by a specific vector shown in the following equation 3.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

Also, $\hat{s}$ is a transmission vector, and can be represented by the following equation 4 using a diagonal matrix P of a transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

In the meantime, the information vector $\hat{s}$ having an adjusted transmission power is applied to a weight matrix W, so that $N_T$ transmission signals $x_1, X_2, \ldots, x_{N_T}$ to be actually transmitted are configured. In this case, the weight matrix W is adapted to properly distribute transmission information to individual antennas according to transmission channel situations. The above-mentioned transmission signals $x_1, X_2, \ldots, x_{N_T}$ can be represented by the following equation 5 using the vector X.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & \ddots & \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = \quad \text{[Equation 5]}$$

$$W\hat{s} = WPs$$

Here, $w_{ij}$ denotes a weight corresponding to i-th Tx antenna and j-th information. W represents a weight matrix or precoding matrix.

Given $N_R$ Rx antennas, signals received at the respective Rx antennas, $y_1, y_2, \ldots, y_{N_R}$ may be represented as the following vector.

$$y = [y_1, y_2, \ldots, y_{N_R}]^T \quad \text{[Equation 6]}$$

When channels are modeled in the MIMO communication system, they may be distinguished according to the indexes of Tx and Rx antennas and the channel between a $j^{th}$ Tx antenna and an $i^{th}$ Rx antenna may be represented as $h_{ij}$. It is to be noted herein that the index of the Rx antenna precedes that of the Tx antenna in $h_{ij}$.

FIG. 5(b) illustrates channels from $N_T$ Tx antennas to an $i^{th}$ Rx antenna. The channels may be represented as vectors and matrices by grouping them. As illustrated in FIG. 5(b), the channels from the $N_T$ Tx antennas to an $i^{th}$ Rx antenna may be expressed as follows.

$$h_i^T = [h_{i1}, h_{i2}, \ldots, h_{iN_T}] \quad \text{[Equation 7]}$$

Also, all channels from the $N_T$ Tx antennas to the $N_R$ Rx antennas may be expressed as the following matrix.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & \ddots & \\ h_{N_R 1} & h_{N_R 2} & \ldots & h_{N_R N_T} \end{bmatrix} \quad \text{[Equation 8]}$$

Actual channels experience the above channel matrix H and then are added with Additive White Gaussian Noise (AWGN). The AWGN $n_1, n_2, \ldots, n_{N_R}$ added to the $N_R$ Rx antennas is given as the following vector.

$$n = [n_1, n_2, \ldots, n_{N_R}]^T \quad \text{[Equation 9]}$$

From the above modeled equations, the received signal can be expressed as follows.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & \ddots & \\ h_{N_R 1} & h_{N_R 2} & \ldots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = \quad \text{[Equation 10]}$$

$$Hx + n$$

In the meantime, the numbers of rows and columns in the channel matrix H representing channel states are determined according to the numbers of Tx and Rx antennas. The number of rows is identical to that of Rx antennas, $N_R$ and the number of columns is identical to that of Tx antennas, $N_T$. Thus, the channel matrix H is of size $N_R * N_T$.

In general, the rank of a matrix is defined as the smaller between the numbers of independent rows and columns. Accordingly, the rank of the matrix is not larger than the number of rows or columns. The rank of the matrix H, rank(H) is limited as follows.

$$\text{rank}(H) \leq \min(N_T, N_R) \quad \text{[Equation 11]}$$

The rank of a matrix may be defined as the number of non-zero Eigen values when the matrix is Eigen-value-decomposed. Similarly, the rank of a matrix may be defined as the number of non-zero singular values when the matrix is singular-value-decomposed. Accordingly, the physical meaning of the rank of a channel matrix can be a maximum number of channels through which different pieces of information can be transmitted.

Codebook-based Precoding

In order to support multi-antenna transmission, precoding for properly distributing information to be transmitted to the respective antennas according to the channel conditions may be employed. The codebook-based precoding technique refers to a technique of predetermining a precoding matrix set in a transmit terminal and a receive terminal, causing the receive terminal to measure channel information from the transmit terminal and feed back, to the transmit terminal, an indication (i.e., a precoding matrix index (PMI)) indicating the most appropriate precoding matrix and causing the transmit terminal to apply appropriate precoding to signal transmission based on the PMI. According to this technique, since an appropriate precoding matrix is selected in the predetermined precoding matrix set, feedback overhead may be reduced compared to the case of explicitly feeding back optimum precoding information through channel information even if optimum precoding is not always applied.

Figure 6:
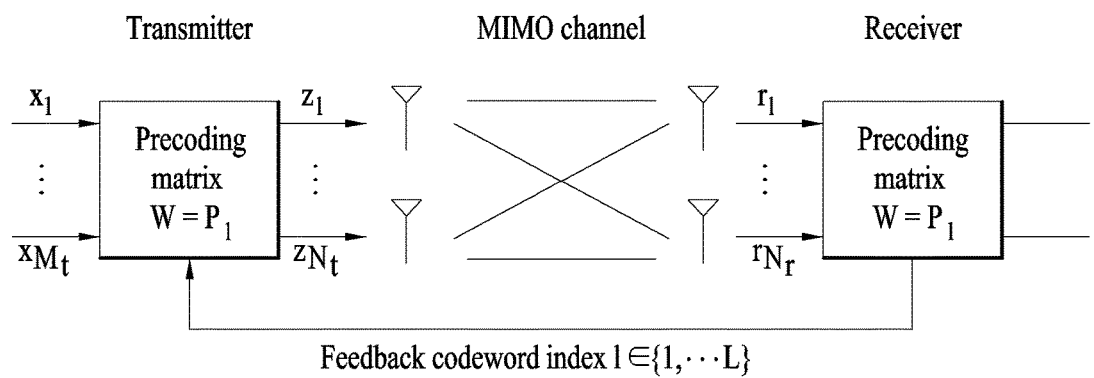
FIG. 6 describes a codebook based beamforming.

FIG. 6 illustrates the basic concept of codebook-based precoding.

According to the codebook-based precoding, the transmit terminal and receive terminal share codebook information including precoding matrices, the number of which is predetermined according to the transmission rank, the number of antennas, and the like. That is, the precoding-based codebook may be used if the feedback information is finite. The receive terminal may measure the channel state through a received signal, and feed back, to the transmit terminal, information about a finite number of preferred precoding matrices (namely, indexes of the corresponding precoding matrices). For example, the received terminal may measure the receive signal using the technique of maximum likelihood (ML) or minimum mean square error (MMSE), and select an optimum precoding matrix. While FIG. 6 illustrates that the receive terminal transmits, to the transmit terminal, precoding matrix information for respective codewords, embodiments of the present invention are not limited thereto.

Upon receiving feedback information from the receive terminal, the transmit terminal may select a specific precoding matrix in a codebook, based on the received information. Upon selecting the precoding matrix, the transmit terminal may perform precoding by multiplying layer signals, the number of which corresponds to a transmission rank by the selected precoding matrix, and transmit a transmit signal obtained through precoding via a plurality of antennas. The number of rows of the precoding matrix equals the number of antennas, and the number of columns of the precoding matrix equals the rank value. Since the rank value equals the number of layers, the number of columns of the precoding matrix equals the number of layers. For example, if the number of transmit antennas is 4, and the number of transmit layers is 2, the precoding matrix may be configured as a 4×2 matrix. Information transmitted through the respective layers using the precoding matrix may be mapped to respective antennas.

Upon receiving the signal precoded and transmitted by the transmit terminal, the receive terminal may restore the received signal by performing reverse processing of the precoding performed by the transmit terminal. Typically, since a precoding matrix satisfies the criterion for a unitary matrix (U) such as $U*U^H=1$, the aforementioned reverse processing of the precoding may be implemented by multiplying the received signal by a Hermitian matrix $P^H$ for the precoding matrix P.

For example, Table 5 below shows a codebook used for downlink transmission using 2 transmit (Tx) antennas in 3GPP LTE Release-8/9, and Table 6 below shows a codebook used for downlink transmission using 4 Tx antennas in 3GPP LTE Release-8/9.

TABLE 5

| Codebook index | Number of rank | |
|---|---|---|
| | 1 | 2 |
| 0 | $\frac{1}{\sqrt{2}}\begin{bmatrix}1\\1\end{bmatrix}$ | $\frac{1}{\sqrt{2}}\begin{bmatrix}1 & 0\\0 & 1\end{bmatrix}$ |
| 1 | $\frac{1}{\sqrt{2}}\begin{bmatrix}1\\-1\end{bmatrix}$ | $\frac{1}{2}\begin{bmatrix}1 & 1\\1 & -1\end{bmatrix}$ |
| 2 | $\frac{1}{\sqrt{2}}\begin{bmatrix}1\\j\end{bmatrix}$ | $\frac{1}{2}\begin{bmatrix}1 & 1\\j & -j\end{bmatrix}$ |
| 3 | $\frac{1}{\sqrt{2}}\begin{bmatrix}1\\-j\end{bmatrix}$ | — |

TABLE 6

| Codebook index | $u_n$ | Number of layers $\upsilon$ | | | |
|---|---|---|---|---|---|
| | | 1 | 2 | 3 | 4 |
| 0 | $u_0 = [1\ -1\ -1\ -1]^T$ | $W_0^{\{1\}}$ | $W_0^{\{14\}}/\sqrt{2}$ | $W_0^{\{124\}}/\sqrt{3}$ | $W_0^{\{1234\}}/2$ |
| 1 | $u_1 = [1\ -j\ 1\ j]^T$ | $W_1^{\{1\}}$ | $W_1^{\{12\}}/\sqrt{2}$ | $W_1^{\{123\}}/\sqrt{3}$ | $W_1^{\{1234\}}/2$ |
| 2 | $u_2 = [1\ 1\ -1\ 1]^T$ | $W_2^{\{1\}}$ | $W_2^{\{12\}}/\sqrt{2}$ | $W_2^{\{123\}}/\sqrt{3}$ | $W_2^{\{3214\}}/2$ |
| 3 | $u_3 = [1\ j\ 1\ -j]^T$ | $W_3^{\{1\}}$ | $W_3^{\{12\}}/\sqrt{2}$ | $W_3^{\{123\}}/\sqrt{3}$ | $W_3^{\{3214\}}/2$ |
| 4 | $u_4 = [1\ (-1-j)/\sqrt{2}\ -j\ (1-j)/\sqrt{2}]^T$ | $W_4^{\{1\}}$ | $W_4^{\{14\}}/\sqrt{2}$ | $W_4^{\{124\}}/\sqrt{3}$ | $W_4^{\{1234\}}/2$ |
| 5 | $u_5 = [1\ (1-j)/\sqrt{2}\ j\ (-1-j)/\sqrt{2}]^T$ | $W_5^{\{1\}}$ | $W_5^{\{14\}}/\sqrt{2}$ | $W_5^{\{124\}}/\sqrt{3}$ | $W_5^{\{1234\}}/2$ |
| 6 | $u_6 = [1\ (1+j)/\sqrt{2}\ -j\ (-1+j)/\sqrt{2}]^T$ | $W_6^{\{1\}}$ | $W_6^{\{13\}}/\sqrt{2}$ | $W_6^{\{134\}}/\sqrt{3}$ | $W_6^{\{1324\}}/2$ |
| 7 | $u_7 = [1\ (-1+j)/\sqrt{2}\ j\ (1+j)/\sqrt{2}]^T$ | $W_7^{\{1\}}$ | $W_7^{\{13\}}/\sqrt{2}$ | $W_7^{\{134\}}/\sqrt{3}$ | $W_7^{\{1324\}}/2$ |
| 8 | $u_8 = [1\ -1\ 1\ 1]^T$ | $W_8^{\{1\}}$ | $W_8^{\{12\}}/\sqrt{2}$ | $W_8^{\{124\}}/\sqrt{3}$ | $W_8^{\{1234\}}/2$ |
| 9 | $u_9 = [1\ -j\ -1\ -j]^T$ | $W_9^{\{1\}}$ | $W_9^{\{14\}}/\sqrt{2}$ | $W_9^{\{134\}}/\sqrt{3}$ | $W_9^{\{1234\}}/2$ |
| 10 | $u_{10} = [1\ 1\ 1\ -1]^T$ | $W_{10}^{\{1\}}$ | $W_{10}^{\{13\}}/\sqrt{2}$ | $W_{10}^{\{123\}}/\sqrt{3}$ | $W_{10}^{\{1324\}}/2$ |
| 11 | $u_{11} = [1\ j\ -1\ j]^T$ | $W_{11}^{\{1\}}$ | $W_{11}^{\{13\}}/\sqrt{2}$ | $W_{11}^{\{134\}}/\sqrt{3}$ | $W_{11}^{\{1324\}}/2$ |
| 12 | $u_{12} = [1\ -1\ -1\ 1]^T$ | $W_{12}^{\{1\}}$ | $W_{12}^{\{12\}}/\sqrt{2}$ | $W_{12}^{\{123\}}/\sqrt{3}$ | $W_{12}^{\{1234\}}/2$ |
| 13 | $u_{13} = [1\ -1\ 1\ -1]^T$ | $W_{13}^{\{1\}}$ | $W_{13}^{\{13\}}/\sqrt{2}$ | $W_{13}^{\{123\}}/\sqrt{3}$ | $W_{13}^{\{1324\}}/2$ |
| 14 | $u_{14} = [1\ 1\ -1\ -1]^T$ | $W_{14}^{\{1\}}$ | $W_{14}^{\{13\}}/\sqrt{2}$ | $W_{14}^{\{123\}}/\sqrt{3}$ | $W_{14}^{\{3214\}}/2$ |
| 15 | $u_{15} = [1\ 1\ 1\ 1]^T$ | $W_{15}^{\{1\}}$ | $W_{15}^{\{12\}}/\sqrt{2}$ | $W_{15}^{\{123\}}/\sqrt{3}$ | $W_{15}^{\{1234\}}/2$ |

In Table 6, $W_n^{\{s\}}$ is obtained with a set $\{s\}$ configured by an equation expressed as $W_n = I - 2u_n u_n^H / u_n^H u_n$. Herein, I denotes a 4×4 single matrix, and $u_n$ has a value given in Table 6.

As shown in Table 5, a codebook for 2 Tx antennas has 7 precoding vectors/matrices. Herein, since the single matrix is intended for an open-loop system, the number of factors/matrices for precoding of a closed-loop system becomes 6. A codebook for 4 Tx antennas as shown in Table 6 has 64 precoding vectors/matrices.

The codebooks described above have common features such as a constant modulus (CM) property, a nested property, constrained alphabet and the like. According to the CM property, no element in the precoding matrices in a codebook includes '0', and the respective elements have the same size. The nested property means that a precoding matrix of a lower rank is designed to be configured as a subset of a specific column of a precoding matrix of a higher rank. The constrained alphabet means that the respective elements in all precoding matrices in a codebook are constrained. For example, the elements of a precoding matrix may be constrained to elements (±1) used for binary phase shift keying (BPSK), elements (±1,±j) used for quadrature phase shift keying (QPSK), or elements $$\left(\pm 1, \pm j, \pm \frac{(1+j)}{\sqrt{2}}, \pm \frac{(-1+j)}{\sqrt{2}}\right)$$

used for 8-PSK. In the example codebook of Table 6, since the alphabet of the respective elements of all precoding matrices in the codebook is configured by $$\left\{\pm 1, \pm j, \pm \frac{(1+j)}{\sqrt{2}}, \pm \frac{(-1+j)}{\sqrt{2}}\right\},$$

the codebook may be considered as having the constrained alphabet property.

Reference signal (RS)

When a packet is transmitted in a wireless communication system, signal distortion may occur during transmission since the packet is transmitted through a radio channel. To correctly receive a distorted signal at a receiver, the distorted signal needs to be corrected using channel information. To detect channel information a signal known to both a transmitter and the receiver is transmitted and channel information is detected with a degree of distortion of the signal when the signal is received through a channel. This signal is called a pilot signal or a reference signal.

When data is transmitted/received using multiple antennas, the receiver can receive a correct signal only when the receiver is aware of a channel state between each transmit antenna and each receive antenna. Accordingly, a reference signal needs to be provided per transmit antenna, more specifically, per antenna port.

Reference signals can be classified into an uplink reference signal and a downlink reference signal. In LTE, the uplink reference signal includes:

i) a demodulation reference signal (DMRS) for channel estimation for coherent demodulation of information transmitted through a PUSCH and a PUCCH; and ii) a sounding reference signal (SRS) used for an eNB to measure uplink channel quality at a frequency of a different network.

The downlink reference signal includes:

i) a cell-specific reference signal (CRS) shared by all UEs in a cell;

ii) a UE-specific reference signal for a specific UE only;

iii) a DMRS transmitted for coherent demodulation when a PDSCH is transmitted;

iv) a channel state information reference signal (CSI-RS) for delivering channel state information (CSI) when a downlink DMRS is transmitted;

v) a multimedia broadcast single frequency network (MB-SFN) reference signal transmitted for coherent demodulation of a signal transmitted in MBSFN mode; and vi) a positioning reference signal used to estimate geographic position information of a UE.

Reference signals can be classified into a reference signal for channel information acquisition and a reference signal for data demodulation. The former needs to be transmitted in a wide band as it is used for a UE to acquire channel information on downlink transmission and received by a UE even if the UE does not receive downlink data in a specific subframe. This reference signal is used even in a handover situation. The latter is transmitted along with a corresponding resource by an eNB when the eNB transmits a downlink signal and is used for a UE to demodulate data through channel measurement. This reference signal needs to be transmitted in a region in which data is transmitted.

As described above, in the LTE system, two kinds of downlink RSs are defined for a unicast service, that is, a cell-specific RS (CRS) and a UE-specific RS. The UE-specific RS is used only for data demodulation, and CRS is used for both RIM measurement such as CSI acquisition and handover in addition to data demodulation. The CRS is transmitted every subframe for the entire system band, and RSs for up to four antenna ports are transmitted according to the number of transmission antennas of the base station. For example, if the number of transmit antennas of the base station is two, the CRS is transmitted for the antenna ports 0 and 1, and if the number of transmit antennas of the base station is four, the CRSs for the antenna ports 0 to 3 are respectively transmitted.

In LTE-A system, maximum 8 transmitting antennas are supported in DL. In LTE-A system, if RS for maximum 8 transmitting antennas are transmitted on full band in each subframe in the same manner of the existing LTE CRS, RS overhead increases excessively. Hence, in LTE-A system, CSI-RS for the purpose of CSI measurement for selection of MCS, PMI and the like and DM-RS for data demodulation are separated from each other, whereby two RSs are added. CSI-RS may be used for the purpose of RRM measurement and the like but is designed for the main purpose of CSI acquisition. Since CSI-RS is not used for data demodulation, it is unnecessary to be transmitted in every subframe. So, in order to reduce overhead of CSI-RS, it is set to transmit CSI-RS on a time axis intermittently. For data demodulation, DM-RS is dedicatedly transmitted to a UE scheduled in the corresponding time-frequency region. Namely, DM-RS of a specific UE is transmitted in a corresponding UE scheduled region, i.e., a data received time-frequency region only.

Figure 7:
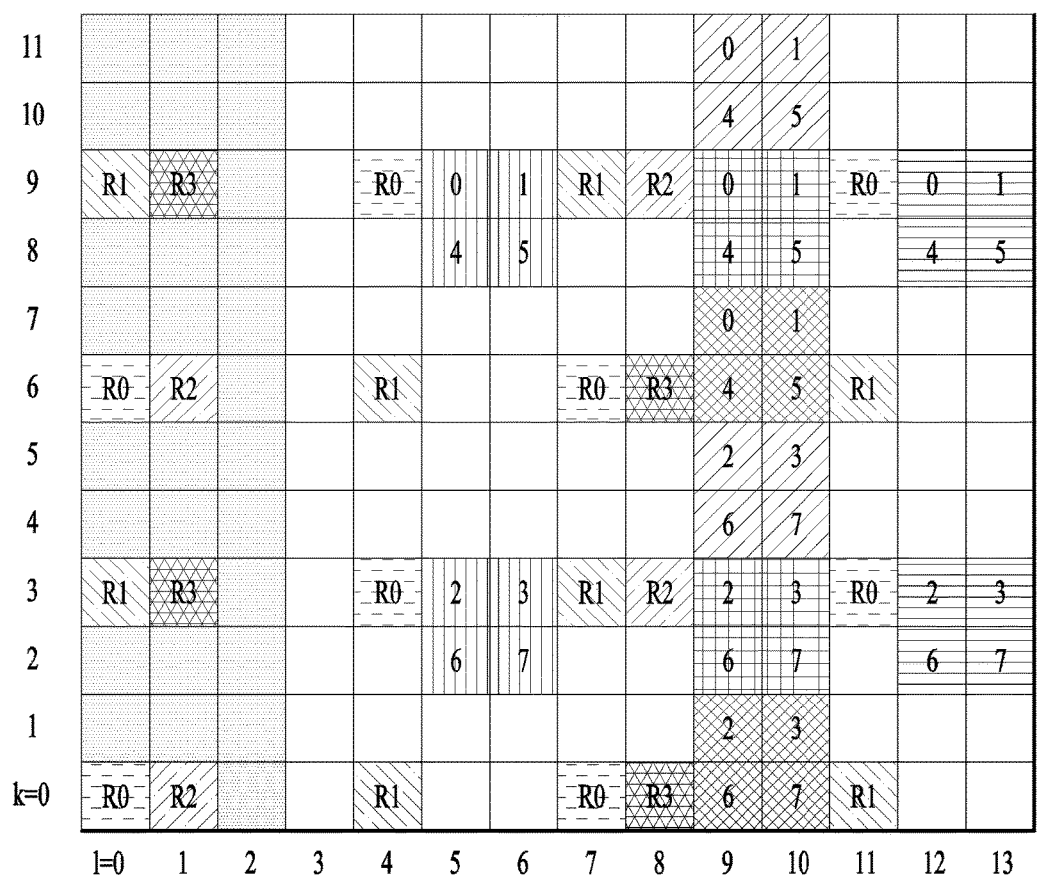
FIG. 7 shows a transmittable pattern of CSI-RS having 8 antenna ports in RB configured with 12 subcarriers in LTE-A system.

FIG. 7 shows a transmittable pattern of CSI-RS having 8 antenna ports in RB configured with 12 subcarriers in LTE-A system. RS for a single antenna port is spread across two OFDM symbols and two RSs are distinguished using an orthogonal code by sharing two Res. For instance, RE denoted by numerals 0 and 1 mean two REs that carry CSI-RS ports 0 and 1. In the present specification, for clarity, the representation as CSI-RS port 0, CSI-RS port 1 and the like is used. For the distinguishment from RS of other types such as CRS and UE-specific RS, CSI-RS port 0, 1 or the like may have an index such as port 15, 16, or the like. CSI-RS may be configured to have 1, 2, or 4 ports as well as 8 ports.

Figure 8:
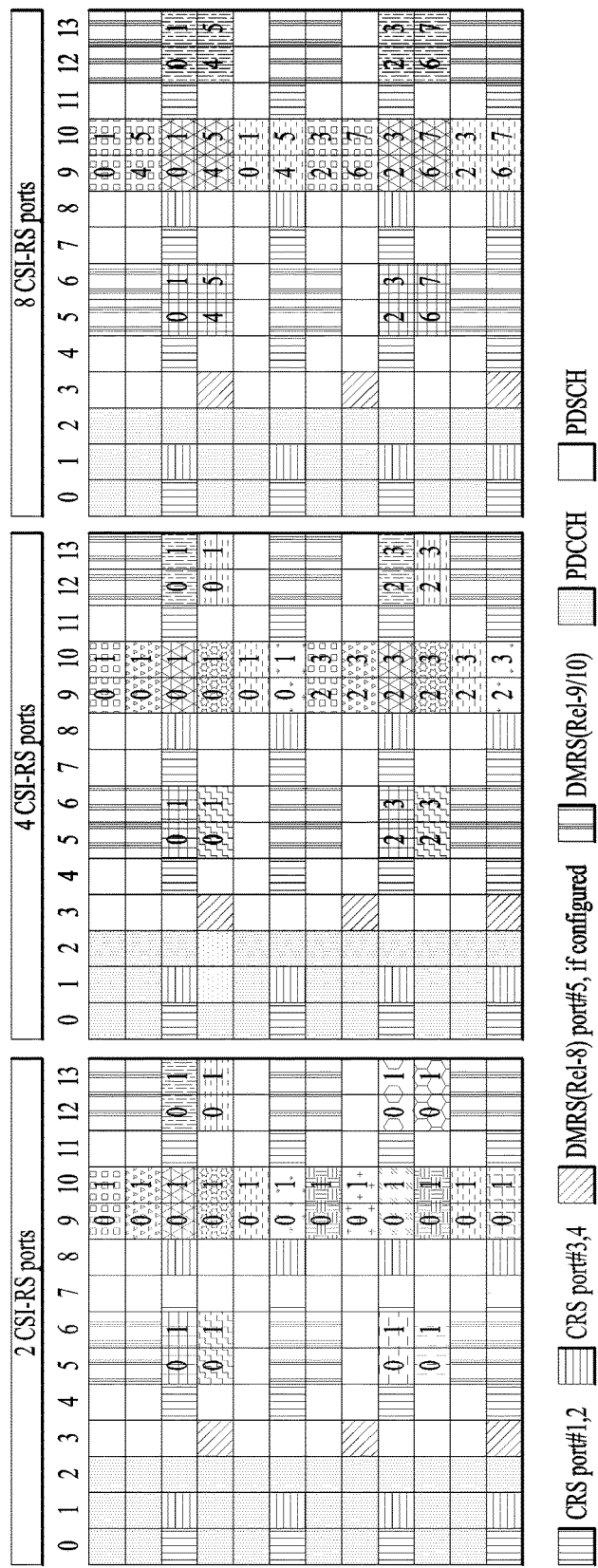
FIG. 8 shows transmission patterns of 2-port, 4-port and 8-port CSI-RS.

Table 7 shows that a location of a transmission RE of N-port CSI-RS in a transmission scheme of a normal CP is represented by a subcarrier index k, an OFDM symbol index l and a slot index $n_s$ in RB. As shown in the table, an 8-port CSI-RS has 5 transmission patterns in a single subframe in common to the frame structure type 1 (FDD mode) and type 2 (TDD mode) of an LTE system. FIG. 8 shows transmission patterns of 2-, 4- and 8-port CSI-RSs.

TABLE 7

| CSI-RS configuration | Number of CSI-RSs configured | | | | | |
|---|---|---|---|---|---|---|
| | 1 or 2 | | 4 | | 8 | |
| | (k', l') | $n_s$mod2 | (k', l') | $n_s$mod2 | (k', l') | $n_s$mod2 |
| FS-1 and FS-2 | | | | | | |
| 0 | (9, 5) | 0 | (9, 5) | 0 | (9, 5) | 0 |
| 1 | (11, 2) | 1 | (11, 2) | 1 | (11, 2) | 1 |
| 2 | (9, 2) | 1 | (9, 2) | 1 | (9, 2) | 1 |
| 3 | (7, 2) | 1 | (7, 2) | 1 | (7, 2) | 1 |
| 4 | (9, 5) | 1 | (9, 5) | 1 | (9, 5) | 1 |
| 5 | (8, 5) | 0 | (8, 5) | 0 | | |
| 6 | (10, 2) | 1 | (10, 2) | 1 | | |
| 7 | (8, 2) | 1 | (8, 2) | 1 | | |
| 8 | (6, 2) | 1 | (6, 2) | 1 | | |
| 9 | (8, 5) | 1 | (8, 5) | 1 | | |
| 10 | (3, 5) | 0 | | | | |
| 11 | (2, 5) | 0 | | | | |
| 12 | (5, 2) | 1 | | | | |
| 13 | (4, 2) | 1 | | | | |
| 14 | (3, 2) | 1 | | | | |
| 15 | (2, 2) | 1 | | | | |
| 16 | (1, 2) | 1 | | | | |
| 17 | (0, 2) | 1 | | | | |
| 18 | (3, 5) | 1 | | | | |
| 19 | (2, 5) | 1 | | | | |

In the current LTE standard, CSI-RS configuration consists of antennaPortsCount, subframeConfig, resourceConfig and the like and indicates the number of antenna ports used to transmit CSI-RS, the period and offset of a subframe for transmitting CSI-RS, and a transmitted RE location (frequency and OFDM symbol index) in the corresponding subframe. Particularly, when a base station delivers specific CSI-RS configuration to a UE, it delivers informations of the following substance.

antennaPortsCount: Parameter (e.g., 1 CSI-RS port, 2 CSI-RS ports, 4 CSI-RS ports, 8 CSI-RS ports, etc.) indicating the number of antenna ports used for transmission of CSI reference signals.

resourceConfig: Parameter as to CSI-RS allocation resource location subframeConfig: Parameter as to a subframe period and offset for transmitting CSI-RS p-C: As to assumption of a UE for reference PDSCH transmission power for CSI feedback CSI-RS, when a UE can have values in a range of [−8, 15] dB as 1 dB step size in deriving CSI feedback, PC corresponds to a rate of CSI-RS EPRE over PDSCH EPRE (energy per resource element).

zero TxPowerResourceConfigList: Parameter as to zero-power CSI-RS configuration zeroTxPowerSubframeConfig: Parameter as to a period and offset of a subframe for transmitting zero-power CSI-RS In an advanced wireless communication, an introduction of an active antenna system (hereinafter abbreviated AAS) is taken into consideration. Unlike an existing manual antenna system in which an amplifier and antenna capable of adjusting a phase and size of a signal are separated, the AAS means a system configured to enable each antenna to include such an active device as an amplifier. The AAS does not require a separate cable, connector, and other hardware for connecting an amplifier and an antenna owing to the use of an active antenna, and is characterized in high efficiency in aspect of energy and management cost. Particularly, since the AAS supports a per-antenna electronic beam control scheme, it enables an advanced MIMO technology of an elaborate beam pattern forming or 3D beam pattern forming in consideration of a beam direction and a beam width.

Figure 9:
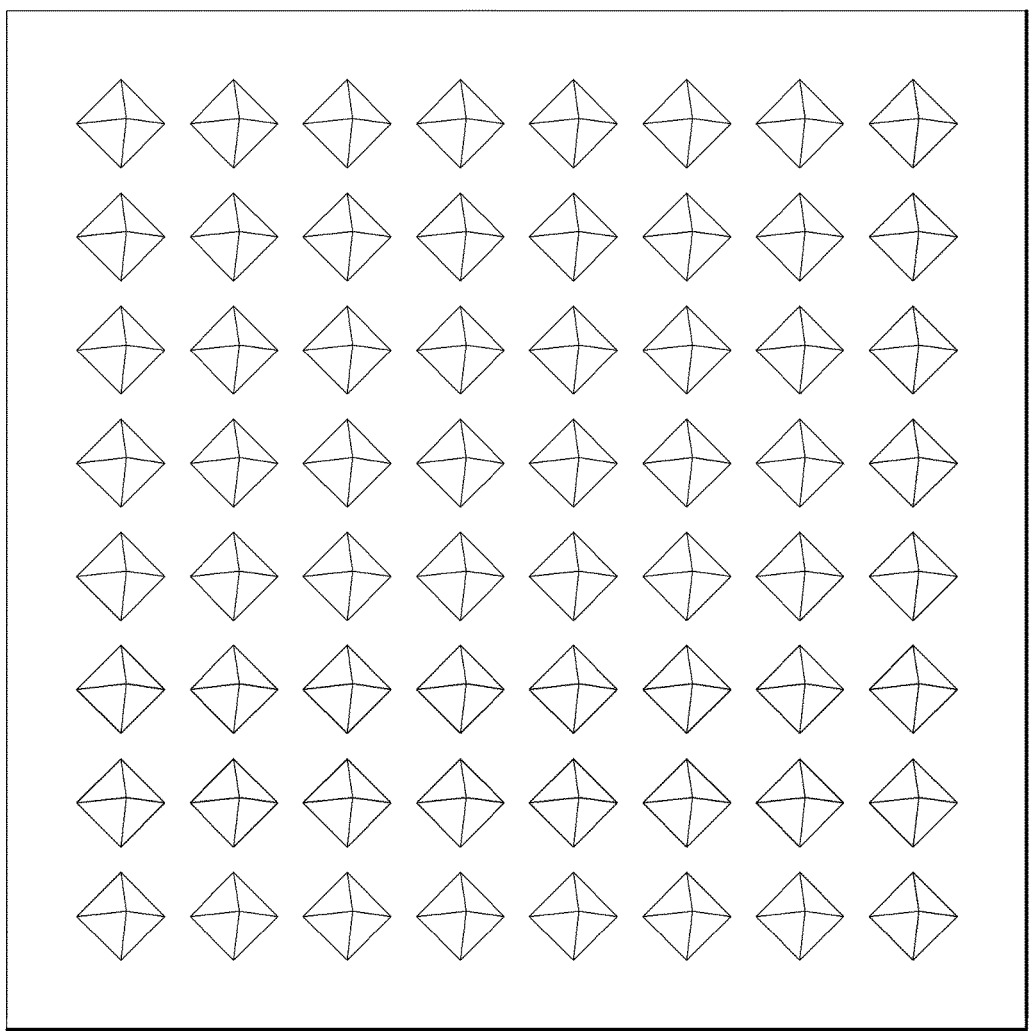
FIG. 9 shows 2D (2-dimensional) antenna array.

According to the introduction of the advanced antenna system such as AAS and the like, a massive MIMO structure having multiple input/output antennas and multi-dimensional antenna configuration is considered as well. For instance, in case of forming a 2D antenna array unlike an existing a linear antenna array, it is able to form a 3D beam pattern by an active antenna of AAS. As a general 2D antenna array, as shown in FIG. 9, $N_t(=N_v \cdot N_h)$ antennas have a square shape. Herein, $N_h$ indicates the number of antenna columns and $N_v$ indicates the number of antenna rows.

Figure 10:
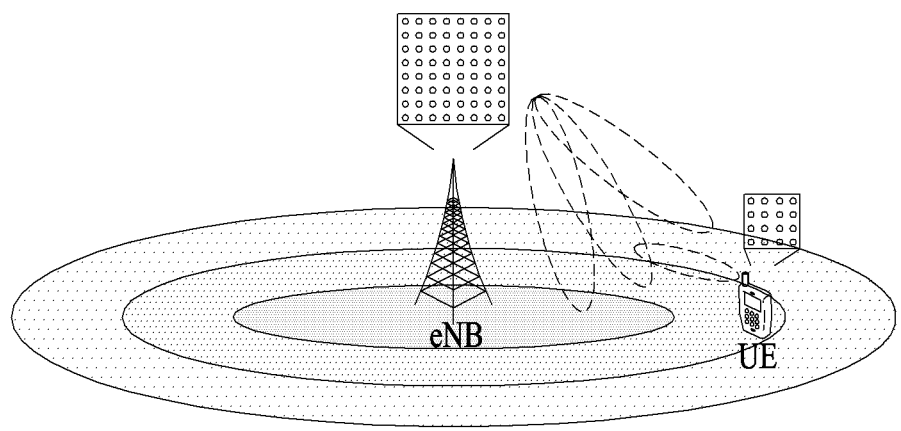
FIG. 10 shows a 3D beam pattern through 2D antenna array.

In case of utilizing the 3D beam pattern in aspect of a transmitting antenna, it is able to perform a semi-static or dynamic beamforming in a vertical direction of a beam as well as in a horizontal direction and consider application such as a vertical sector forming and the like for example. Moreover, in aspect of a receiving antenna, when a received beam is formed using a massive antenna, it is able to expect a signal power ascending effect according to an antenna array gain. Hence, in case of uplink, a base station can receive a signal transmitted from a UE through an antenna. In doing so, in order to reduce an interference effect, the UE can advantageously set its transmission power to a very low power in consideration of a gain of a massive receiving antenna. FIG. 10 diagrammatizes the above example and shows a system in which a base station or UE has multiple transmitting/receiving antennas capable of AAS based 3D beamforming.

In the present specification, proposed is a scheme for a UE to make a CSI report by selecting an optimal precoding matrix in consideration of a corresponding penalty in a manner of giving a different penalty per precoding matrix in a codebook in a codebook based MIMO system. Herein, the determination of the penalty per precoding matrix is made depending on causing a prescribed level of inter-cell interference due to a use of a corresponding precoding matrix. A base station determines a per-precoding penalty and then informs a UE of the determined penalty. The UE applies the penalty per precoding matrix, calculates a transmission capacity, which can be obtained if a data signal is transmitted by applying the corresponding precoding matrix, compares the calculated transmission capacities, and then reports a precoding matrix capable of a maximum transmission capacity to a base station.

In a codebook based DL MIMO (multiple input multiple output) system, when a UE reports a CIS, the UE finds and reports a rank of maximizing a data transmission rate and a precoding matrix of the corresponding rank in a codebook. And, the UE also calculates and reports a CQI corresponding to a case that the selected and reported rank and precoding matrix are applied.

Generally, in an MIMO system having Nt transmitting antennas and Nr receiving antennas, a received signal can be represented as the following formula.

$$y = \sqrt{E_D} H W s + n \qquad \text{[Equation 12]}$$

Herein, H indicates an Nr×Nt channel matrix, s indicates an L×1 transmission data vector, and W indicates an Nt×L precoding matrix. L is the number of simultaneously transmitted data layers and may be called the stream number or rank. And, $E_D$ indicates transmission energy per transmission data symbol. Moreover, n and y indicate a noise vector and a received signal vector as Nr×1 vectors, respectively.

Since a UE needs to know a channel matrix in order to report CSI, such a matrix should be estimated. And, such channel estimation is performed through RS. An RS signal transmitted for an $i^{th}$ antenna port can be represented as the following formula.

$$y_{RS,i} = \sqrt{E_{RS}} H s_{RS,i} + n \qquad \text{[Equation 13]}$$

Herein, $s_{RS,i}$ is an Nt×1 vector, in which an $i^{th}$ element is 1 and the rest of elements are 0, and indicates an RS transmitted through an $i^{th}$ antenna port. $E_{RS}$ indicates transmission energy per transmission RS symbol. Hence, a received signal for the RS of the $i^{th}$ antenna port can be represented as an $i^{th}$ column $h_i$ of the following matrix. Herein, $h_i$ indicates a channel vector between an $i^{th}$ transmitting antenna port and Nr receiving antennas.

$$y_{Rs,i} = \sqrt{E_{RS}} h_i + n \qquad \text{[Equation 14]}$$

Hence, $h_i$ can be estimated through the received signal $y_{Rs,i}$. If all RSs for the Nt antenna ports are received, a full channel matrix can be estimated.

$$[f(y_{Rs,1}) \ldots f(y_{RS,N_t})] = \sqrt{E_{RS}} \tilde{H} \qquad \text{[Equation 15]}$$

If the estimated channel matrix is corrected at the rate of data transmission energy over RS transmission energy, it is able to estimate a channel when a final data is transmitted.

$$\sqrt{E_D} \tilde{H} = \sqrt{E_D/E_{RS}} [f(y_{RS,i}) \ldots f(y_{RS,N_t})] \qquad \text{[Equation 16]}$$

The UE calculates effective channel matrixes $\tilde{H}_{eff,k}$ of the following formula by multiplying the estimated channel by $k^{th}$ precoding matrixes $w_k$ in the codebook, and then calculates a data transmission rate $T_k$ that can be achieved through the corresponding effective channel. Namely, $T_k$ indicates data capacity obtainable using the $k^{th}$ precoding matrix.

$$\tilde{H}_{eff,k} = \sqrt{E_D} \tilde{H} W_k \qquad \text{[Equation 17]}$$

$$T_k = g(\tilde{H}_{eff,k}) \qquad \text{[Equation 18]}$$

The UE finally makes a report by calculating a precoding matrix maximizing a data transmission rate and a CQI on applying the corresponding precoding matrix.

If specific precoding matrixes in a codebook are not appropriate for a current use, a base station can put restriction per precoding matrix in the codebook in order to prevent the corresponding precoding matrixes from being selected and reported by a UE. Namely, the base station informs the UE of 1-bit information per precoding matrix in the codebook, thereby indicating that the corresponding precoding matrix cannot be selected and reported if the restriction bit is '0' or that the corresponding precoding matrix can be selected and reported if the restriction bit is '1'. Precoding matrixes, which are designated to be selected and reported by a UE, in a codebook are called a subset. In this scheme, the UE does not differentiate a precoding matrix in a subset. Namely, that corresponds to hard restriction of a codebook.

The present invention proposes soft restriction extended from the concept of hard restriction. According to a proposed scheme, a base station informs a UE of a penalty per precoding matrix in a codebook through at least one bit. When a UE selects an optimal precoding matrix for a CSI report, it considers a corresponding penalty. A base station sets penalty per precoding matrix to infinity, thereby designating that a corresponding precoding matrix cannot be selected and reported by the US in any circumstances. Namely, penalty information delivered through at least one bit can enable a specific state to designate that a penalty is infinite. Or, precoding matrixes in a codebook are grouped and then a UE is informed of a penalty per group through at least one bit. Herein, a precoding matrix belongs to a single group only.

In the proposed scheme, the increase of penalty per precoding matrix means that a cost supposed to be paid due to a use of a corresponding precoding matrix is high. In a mobile communication system, the cost can be considered in various aspects and may representatively include complexity and transmission power distribution of a transmitter or a level of caused inter-cell interference. According to the paid cost, penalty may be represented in various ways.

For example, a penalty is a weight expressed as a real number between 0 and 1. And, the weight is applied to a data rate obtainable in case of transmitting data using a corresponding precoding matrix. Namely, if a weight on using a $k^{th}$ precoding matrix is set to $w_k$, it is applied to a data transmission rate so as to obtain a weight applied data transmission rate as follows.

$$WT_k = w_k \cdot g(\tilde{H}_{eff,k})$$ [Equation 19]

In this scheme, a UE can select and report a precoding matrix capable of maximally achieving a weight applied data transmission rate by applying a penalty per precoding matrix. In this case, a precoding matrix having the weight designated as 0 is excluded from the selection. Namely, hard restriction is put on the corresponding precoding matrix.

For another example, when a signal is transmitted using a specific precoding matrix, if inter-cell interference increases by x [dB], it is able to use a method of transmitting a signal by lowering a transmitted signal power by x [dB] in order to prevent the increase of the inter-cell interference. In this case, a weight may be expressed as a decrease x [dB] of a transmission power per precoding matrix. When a UE calculates a received signal quality per precoding matrix, the UE considers a difference of transmission power per precoding matrix. If this is reflected by an effective channel matrix, it is able to calculate an effective channel matrix, which corresponds to a case of using a $k^{th}$ precoding matrix in the following, by applying a penalty per precoding matrix.

$$\tilde{H}_{eff,k} = 10^{-(x_k/10)}\sqrt{E_D}HW_k$$ [Equation 20]

In this scheme, a penalty per precoding matrix may be regarded as an offset of PDSCH transmission energy. In this case, a precoding matrix having the decrease x [dB] designated as infinity is selected from the selection. Namely, hard restriction is put on the corresponding precoding matrix.

Examples of applying a penalty per precoding matrix, which is determined depending on how much inter-cell interference is caused due to a use of a corresponding precoding matrix, are described representatively as follows.

According to a first example of application, a penalty is differently applied according to a beam direction formed by a precoding matrix in a 3D MIMO system that uses both a horizontal adjustment and a vertical adjustment of a transmitted signal beam. Generally, a change of level of interference caused to an adjacent cell is not big according to a horizontal adjustment of a transmitted beam. Yet, a level of interference caused to an adjacent cell is considerably changed according to a vertical adjustment of a transmitted beam. If a transmitted beam is further tilted down in a vertical direction, since a transmitted signal fails to go in a long distance, adjacent cell interference gets smaller. On the contrary, if a transmitted beam is further tilted up, adjacent cell interference gets bigger. Hence, a precoding matrix is determined by considering both a level of reception quality improvement of a transmitted signal obtained by a vertical tilt of a precoding matrix considered in comparison with a transmitted beam of a basic tilt and a level of an increase of an interference quantity caused to an adjacent cell.

Yet, since it is difficult for a UE to obtain a level of adjacent cell interference caused by a vertical tilt of a transmitted beam, a base station obtains an experience value for a level of interference caused to an adjacent cell per precoding matrix, calculates a penalty per precoding matrix correspondingly, and then informs the UE of the calculated penalty. In this case, using a transmitting method by lowering a transmitted signal power by x [dB] in order to prevent the increase of inter-cell interference, the penalty can be indicated in form of offset of a data transmitted signal power. Namely, the base station announces the offset of the data transmitted signal power applied per precoding matrix and the UE selects a precoding matrix by reflecting such offset.

In the first example of application, the base station announces the offset of the data transmitted signal power applied per precoding matrix by grouping precoding matrixes, and the UE selects a precoding matrix by reflecting such offset. In this case, the base station can group the precoding matrixes having the same vertical beam or a similar vertical tilt into the same group. Or, as to a scheme of using a codebook configured with a matrix represented by Kronecker product of a precoding matrix $w_D^{(H)}$ of a horizontal antenna and a precoding matrix $w_D^{(V)}$ a vertical antenna as a codebook used for 3D MIMO, an offset of a data transmitted signal power applied per the precoding matrix $w_D^{(V)}$ of the vertical antenna is announced. Or, as to a scheme of using a dual codebook configured with a matrix expressed as a function of $W_1$ and $W_2$ as a codebook, an offset of a data transmitted signal power applied per a precoding matrix $W_1$ is announced.

According to a second example of application, a penalty is differently applied according to a width of a transmitted signal beam. Although a transmission of a narrow beam can provide a high received signal quality to a serving UE in case of an accurate beam direction, when a channel variation is serious due to high mobility of a UE, it is highly probable that a quality at the data received timing is degraded due to a delay of CSI feedback. On the contrary, it is less probable that a transmission of a wide beam may have quality degradation due to a delay of CSI feedback. Yet, in aspect of an interference level given to an adjacent cell, a transmission of a narrow beam has transmission energy concentrated on a specific point so as to cause interference to a UE of a neighbor cell in part, but a transmission of a wide beam is spread into a wide area so as to cause interference to many UEs of a neighbor cell.

According to the above example of application, a base station sorts precoding matrixes of a codebook into several groups by beam width, designates a different penalty per group, and then announces the designated penalty. In this case, a UE determines whether to select an optimal precoding matrix from precoding matrixes of a prescribed group according to a level of channel variation and calculates CSI by applying the penalty designated to the corresponding group.

As a third example of application, a multi-cell cooperative transmission scheme or a CoMP (coordinated multipoint) transmission scheme is exampled. According to the multi-cell cooperative transmission scheme or the CoMP transmission scheme, a UE should estimate a channel matrix from multiple transmission points (TP) and then report a CSI for it. For such an operation, the UE receives a multitude of CSI-RS configurations from a base station. Herein, each CSI-RS may be transmitted from a different transmission point. Although a signal is transmitted using the same precoding matrix according to a geographical environment and antenna configuration of a transmission point, interference caused to an adjacent cell may differ. Representatively, if a height of a transmission point is different, adjacent cell interference caused by the same vertical tilt becomes different. Hence, when a penalty is differently designated per precoding matrix according to the present proposed scheme, a penalty is individually designated per CSI-RS configuration. Namely, a penalty is independently designated per precoding matrix of each CSI-RS configuration. Or, a penalty is independently designated per precoding matrix group of each CSI-RS configuration.

In the CoMP transmission scheme, in order to report a channel from multiple transmission points, a UE may receive configurations of a multitude of CSI processes. Each CSI process includes a single CSI-RS configuration for received signal measurement and a single CSI-RS configuration for interference level measurement. Moreover, a CSI report resource is allocated per CSI process. In case that UE receives configurations of a multitude of CSI processes, a penalty is individually designated per CSI process configuration by applying the present proposed scheme. Namely, a penalty is independently designated per precoding matrix of each CSI process configuration. Or, a penalty is independently designated per precoding matrix group of each CSI-RS configuration.

Moreover, in a scheme of dividing a subframe into a multitude of CSI subframe sets and reporting an independent CSI per subframe set, a penalty is individually designated per CSI subframe set. Namely, a penalty is independently designated per precoding matrix of each CSI subframe set. Or, a penalty is independently designated per precoding matrix group of each CSI subframe set.

As a modification of the proposed scheme, the same penalty may be designated to precoding matrixes belonging to the same rank. Namely, in case of configuring the precoding matrixes belonging to the same rank into a single group, a penalty is individually designated according to the number of transport layers. If this case applies to the multi-cell cooperative transmission scheme, it results in the following.

A penalty may be independently designated per rank of each CSI-RS configuration. Or, a penalty may be independently designated per rank of each CSI process configuration. Or, a penalty may be independently designated per rank of each subframe set.

Figure 11:
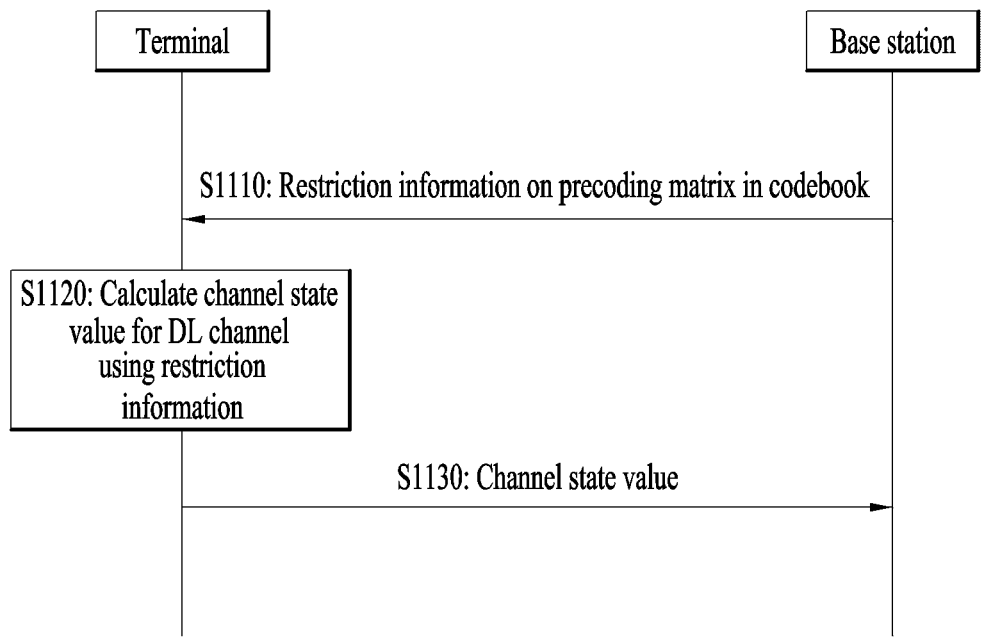
FIG. 11 shows an operation according to one embodiment of the present invention.

FIG. 11 shows an operation according to one embodiment of the present invention.

A terminal 111 may receive restriction information on a precoding matrix in a codebook from a base station 112 [S1110]. The restriction information on the precoding matrix may be expressed as at least one bit value. Moreover, the restriction information on the precoding matrix may be determined depending on an inter-cell interference level.

The terminal may calculate a channel state value for the DL channel using the restriction information [S1120]. Thereafter, the terminal may send the calculated channel state value to the base station [S1130].

The restriction information on the precoding matrix may include an offset of DL transmission power.

The restriction information on the precoding matrix may include restriction information designated to each of a plurality of CSI-RS (channel state information-reference signal) configurations configured for the terminal.

The restriction information on the precoding matrix may include restriction information designated to each of a plurality of CSI processes configured for the terminal.

The restriction information on the precoding matrix may include restriction information designated to each of a plurality of CSI subframe sets configured for the terminal.

The restriction information on the precoding matrix may include restriction information per precoding group in the codebook. The precoding group may be divided based on a beam direction or beam width of a DL transmitted signal.

The operation of the terminal or the base station shown in FIG. 1 may include at least one of the aforementioned detailed embodiments of the present invention as well as the former embodiment described with reference to FIG. 11.

Figure 12:
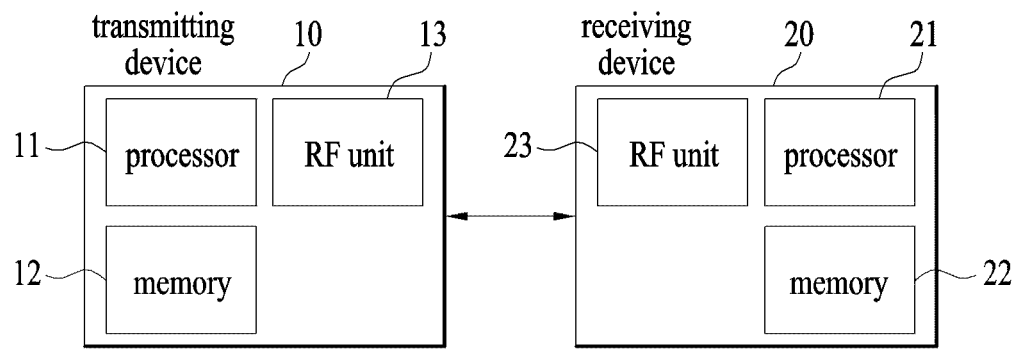
FIG. 12 is a block diagram of a device for implementing embodiment(s) of the present invention.

FIG. 12 is a block diagram illustrating a transmitter 10 and a receiver 20 configured to implement embodiments of the present invention. Each of the transmitter 10 and receiver 20 includes a radio frequency (RF) unit 13, 23 capable of transmitting or receiving a radio signal that carries information and/or data, a signal, a message, etc., a memory 12, 22 configured to store various kinds of information related to communication with a wireless communication system, and a processor 11, 21 operatively connected to elements such as the RF unit 13, 23 and the memory 12, 22 to control the memory 12, 22 and/or the RF unit 13, 23 to allow the device to implement at least one of the embodiments of the present invention described above.

The memory 12, 22 may store a program for processing and controlling the processor 11, 21, and temporarily store input/output information. The memory 12, 22 may also be utilized as a buffer. The processor 11, 21 controls overall operations of various modules in the transmitter or the receiver. Particularly, the processor 11, 21 may perform various control functions for implementation of the present invention. The processors 11 and 21 may be referred to as controllers, microcontrollers, microprocessors, microcomputers, or the like. The processors 11 and 21 may be achieved by hardware, firmware, software, or a combination thereof. In a hardware configuration for an embodiment of the present invention, the processor 11, 21 may be provided with application specific integrated circuits (ASICs) or digital signal processors (DSPs), digital signal processing devices (DSPDs), programmable logic devices (PLDs), and field programmable gate arrays (FPGAs) that are configured to implement the present invention. In the case which the present invention is implemented using firmware or software, the firmware or software may be provided with a module, a procedure, a function, or the like which performs the functions or operations of the present invention. The firmware or software configured to implement the present invention may be provided in the processor 11, 21 or stored in the memory 12, 22 to be driven by the processor 11, 21.

The processor 11 of the transmitter 10 performs predetermined coding and modulation of a signal and/or data scheduled by the processor 11 or a scheduler connected to the processor 11, and then transmits a signal and/or data to the RF unit 13. For example, the processor 11 converts a data sequence to be transmitted into K layers through demultiplexing and channel coding, scrambling, and modulation. The coded data sequence is referred to as a codeword, and is equivalent to a transport block which is a data block provided by the MAC layer. One transport block is coded as one codeword, and each codeword is transmitted to the receiver in the form of one or more layers. To perform frequency-up transformation, the RF unit 13 may include an oscillator. The RF unit 13 may include Nt transmit antennas (wherein Nt is a positive integer greater than or equal to 1).

The signal processing procedure in the receiver 20 is configured as a reverse procedure of the signal processing procedure in the transmitter 10. The RF unit 23 of the receiver 20 receives a radio signal transmitted from the transmitter 10 under control of the processor 21. The RF unit 23 may include Nr receive antennas, and retrieves baseband signals by frequency down-converting the signals received through the receive antennas. The RF unit 23 may include an oscillator to perform frequency down-converting. The processor 21 may perform decoding and demodulation on the radio signal received through the receive antennas, thereby retrieving data that the transmitter 10 has originally intended to transmit.

The RF unit 13, 23 includes one or more antennas. According to an embodiment of the present invention, the antennas function to transmit signals processed by the RF unit 13, 23 are to receive radio signals and deliver the same to the RF unit 13, 23. The antennas are also called antenna ports. Each antenna may correspond to one physical antenna or be configured by a combination of two or more physical antenna elements. A signal transmitted through each antenna cannot be decomposed by the receiver 20 anymore. A reference signal (RS) transmitted in accordance with a corresponding antenna defines an antenna from the perspective of the receiver 20, enables the receiver 20 to perform channel estimation on the antenna irrespective of whether the channel is a single radio channel from one physical antenna or a composite channel from a plurality of physical antenna elements including the antenna. That is, an antenna is defined such that a channel for delivering a symbol on the antenna is derived from a channel for delivering another symbol on the same antenna. An RF unit supporting the Multiple-Input Multiple-Output (MIMO) for transmitting and receiving data using a plurality of antennas may be connected to two or more antennas.

In embodiments of the present invention, the UE operates as the transmitter 10 on uplink, and operates as the receiver 20 on downlink. In embodiments of the present invention, the eNB operates as the receiver 20 on uplink, and operates as the transmitter 10 on downlink.

The transmitter and/or receiver may be implemented by one or more embodiments of the present invention among the embodiments described above.

Detailed descriptions of preferred embodiments of the present invention have been given to allow those skilled in the art to implement and practice the present invention. Although descriptions have been given of the preferred embodiments of the present invention, it will be apparent to those skilled in the art that various modifications and variations can be made in the present invention defined in the appended claims. Thus, the present invention is not intended to be limited to the embodiments described herein, but is intended to have the widest scope consistent with the principles and novel features disclosed herein.

INDUSTRIAL APPLICABILITY

The present invention is applicable to wireless communication devices such as a terminal, a relay, and a base station.

What is claimed is:

1. A method of reporting a channel state of a downlink channel, by a terminal, the method comprising:

receiving, from a base station, restriction information on a precoding matrix in a codebook, wherein the restriction information on the precoding matrix is represented by at least one bit value, and the restriction information on the precoding matrix includes an offset of downlink transmission power;

calculating a channel state value for the downlink channel using the restriction information; and transmitting, to the base station, the calculated channel state value.

2. The method of claim 1, wherein the restriction information on the precoding matrix is determined depending on an inter-cell interference level.

3. The method of claim 1, wherein the restriction information on the precoding matrix includes restriction information per precoding group in the codebook.

4. The method of claim 3, wherein the precoding group is divided based on a beam direction or beam width of a downlink transmitted signal.

5. The method of claim 1, wherein the restriction information on the precoding matrix includes restriction information designated to each of a plurality of channel state information — reference signal (CSI-RS) configurations configured for the terminal.

6. The method of claim 1, wherein the restriction information on the precoding matrix includes restriction information designated to each of a plurality of channel state information (CSI) processes configured for the terminal.

7. The method of claim 1, wherein the restriction information on the precoding matrix includes restriction information designated to each of a plurality of channel state information (CSI) subframe sets configured for the terminal.

8. A terminal configured to report a channel state of a downlink channel, the terminal comprising:

a transceiver; and a processor configured to control the transceiver, wherein the processor is further configured to receive, from a base station, restriction information on a precoding matrix in a codebook, wherein the restriction information on the precoding matrix is represented by at least one bit value, and the restriction information on the precoding matrix includes an offset of downlink transmission power, and wherein the processor is further configured to calculate a channel state value for the downlink channel using the restriction information and transmit, to the base station, the calculated channel state value.

9. The terminal of claim 8, wherein the restriction information on the precoding matrix is determined depending on an inter-cell interference level.

10. The terminal of claim 8, wherein the restriction information on the precoding matrix includes restriction information per precoding group in the codebook.

11. The terminal of claim 10, wherein the precoding group is divided based on a beam direction or beam width of a downlink transmitted signal.

12. The terminal of claim 8, wherein the restriction information on the precoding matrix includes restriction information designated to each of a plurality of channel state information — reference signal (CSI-RS) configurations configured for the terminal.

13. The terminal of claim 8, wherein the restriction information on the precoding matrix includes restriction information designated to each of a plurality of channel state information (CSI) processes configured for the terminal.

14. The terminal of claim 8, wherein the restriction information on the precoding matrix includes restriction information designated to each of a plurality of channel state information (CSI) subframe sets configured for the terminal.

\* \* \* \* \*